US012605938B2

(12) United States Patent
Nagashima et al.

(10) Patent No.: US 12,605,938 B2
(45) Date of Patent: Apr. 21, 2026

(54) LIQUID SUPPLY APPARATUS

(71) Applicant: CANON KABUSHIKI KAISHA, Tokyo (JP)

(72) Inventors: Masakazu Nagashima, Kanagawa (JP); Akira Fujikake, Kanagawa (JP); Ryohei Maruyama, Kanagawa (JP); Hiromasa Yoneyama, Kanagawa (JP); Daigo Kuronuma, Kanagawa (JP); Hideyuki Nozawa, Tochigi (JP); Tomoyuki Nagase, Kanagawa (JP); Yuto Nitami, Kanagawa (JP); Kichinosuke Hirokawa, Tokyo (JP); Kenta Iimura, Tokyo (JP); Naoaki Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 18/647,471

(22) Filed: Apr. 26, 2024

(65) Prior Publication Data

US 2024/0359477 A1 Oct. 31, 2024

(30) Foreign Application Priority Data

Apr. 28, 2023 (JP) ................................ 2023-074953

(51) Int. Cl.
*B41J 2/175* (2006.01)
*B41J 2/14* (2006.01)

(52) U.S. Cl.
CPC .. *B41J 2/17523* (2013.01); *B41J 2002/14193* (2013.01); *B41J 2002/17516* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2002/14193; B41J 2002/17516
See application file for complete search history.

(56) References Cited

U.S. PATENT DOCUMENTS

| | | | | |
|---|---|---|---|---|
| 5,854,646 | A * | 12/1998 | Barinaga | B41J 2/17513 347/85 |
| 2010/0231662 | A1 | 9/2010 | Ara et al. | B41J 2/175 |
| 2013/0235133 | A1 | 9/2013 | Watanabe et al. | B41J 2/19 |
| 2015/0077462 | A1* | 3/2015 | Suzuki | B41J 29/38 347/85 |

(Continued)

FOREIGN PATENT DOCUMENTS

| | | | |
|---|---|---|---|
| JP | 2006281590 | A | 10/2006 |
| JP | 2020131648 | A | 8/2020 |

*Primary Examiner* — Anh T Vo
(74) *Attorney, Agent, or Firm* — Venable LLP

(57) ABSTRACT

A liquid supply apparatus includes a holding member configured to detachably hold a tray, on which a flexible container provided with a supply port for supplying a liquid to a printhead, is placed, a press member configured to press the container attached to the liquid supply apparatus, a movable member configured to move the press member to a first position where the press member presses the container and a second position where a press amount of the press member for the container is less than at the first position, a first spring having one end locked on the press member and the other end locked on the holding member, and a second spring having one end locked on the press member and the other end locked on the movable member.

16 Claims, 24 Drawing Sheets

(56) References Cited

U.S. PATENT DOCUMENTS

| | | | | |
|---|---|---|---|---|
| 2015/0273850 | A1* | 10/2015 | Ohnishi | B41J 2/17596 347/94 |
| 2017/0087851 | A1 | 3/2017 | Obata et al. | B41J 2/165 |
| 2017/0087854 | A1 | 3/2017 | Sugiyama et al. | B41J 2/175 |
| 2019/0009564 | A1 | 1/2019 | Fujikake et al. | B41J 2/18 |
| 2019/0232671 | A1 | 8/2019 | Danzuka et al. | B41J 2/175 |
| 2020/0016893 | A1* | 1/2020 | Ono | B41J 2/04571 |
| 2020/0338899 | A1 | 10/2020 | Wada et al. | B41J 2/175 |
| 2022/0097388 | A1* | 3/2022 | Nanjo | B41J 2/17513 |

* cited by examiner

FIG. 11A
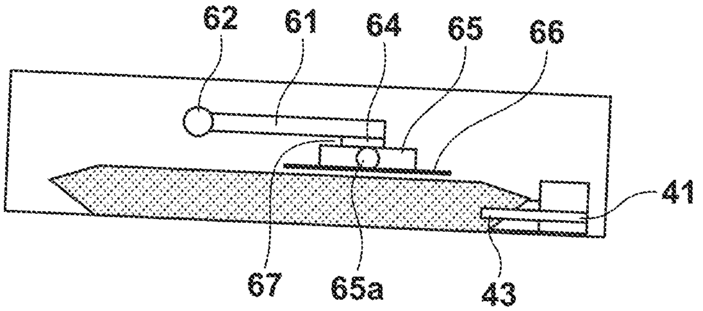
FIG. 11B
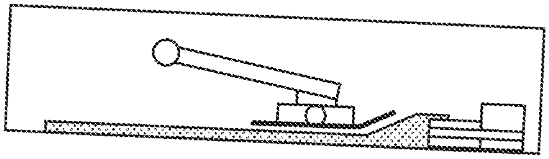
FIG. 11C
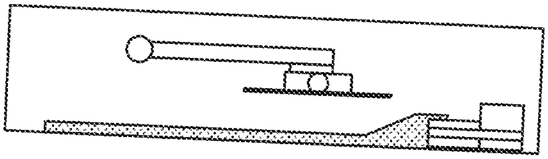
FIG. 12
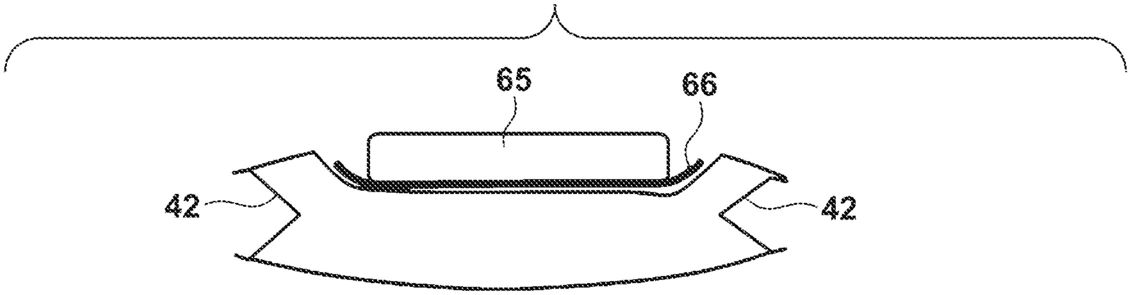
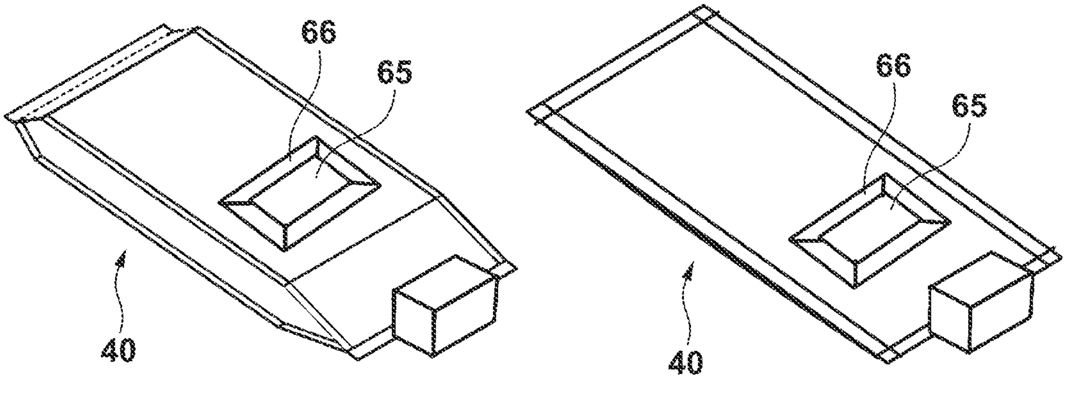

FIG. 22

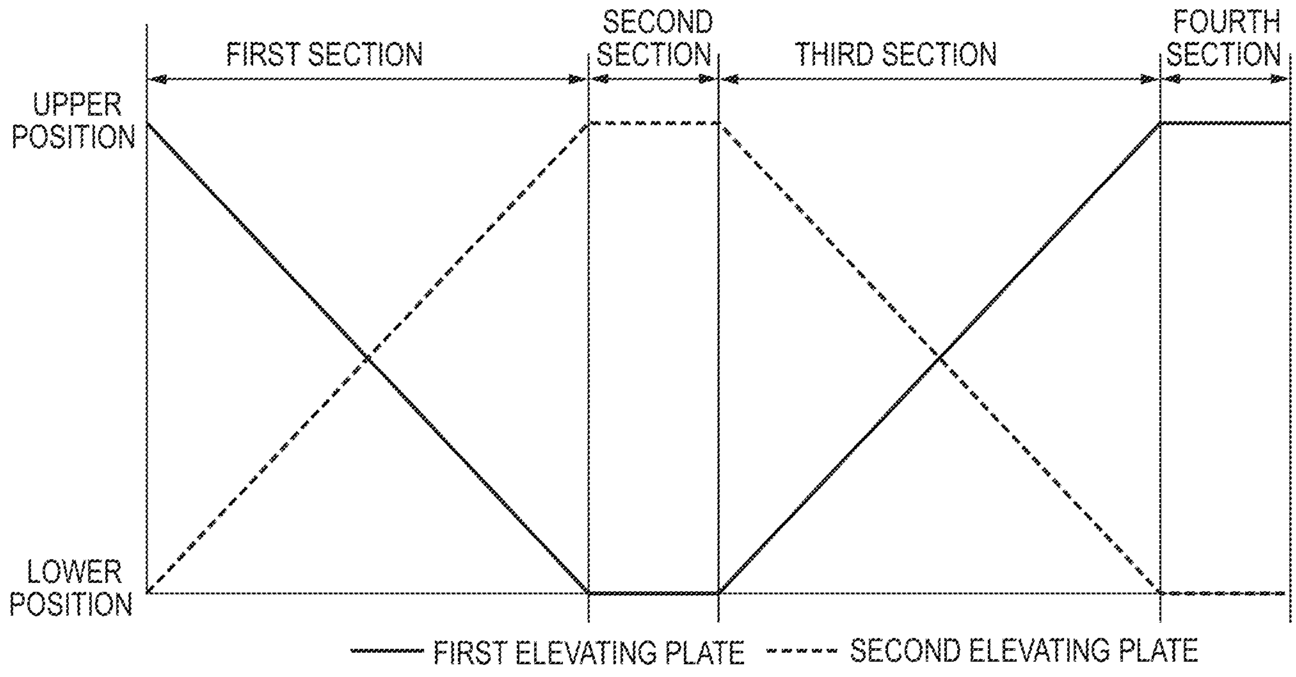

| UPPER | FIRST SECTION | SECOND SECTION | THIRD SECTION | FOURTH SECTION |
|---|---|---|---|---|
| FIRST ELEVATING PLATE | MOVE DOWNWARD | LOWER POSITION | MOVE UPWARD | UPPER POSITION |
| UPPER PRESS PLATE | - | PRESS STATE | - | CANCEL STATE |

| LOWER | FIRST SECTION | SECOND SECTION | THIRD SECTION | FOURTH SECTION |
|---|---|---|---|---|
| SECOND ELEVATING PLATE | MOVE UPWARD | UPPER POSITION | MOVE DOWNWARD | LOWER POSITION |
| LOWER PRESS PLATE | - | CANCEL STATE | - | PRESS STATE |

LIQUID SUPPLY APPARATUS

BACKGROUND OF THE INVENTION

Cross-Reference to Priority Application

This application claims the benefit of Japanese Patent Application No. 2023-074953, filed Apr. 28, 2023, which is hereby incorporated by reference herein in its entirety.

Field of the Invention

The present invention relates to a liquid supply apparatus that supplies a liquid to a printing apparatus.

Description of the Related Art

Conventionally, a liquid supply apparatus using a bag-shaped liquid container made of a flexible material is known. In a printing apparatus as well, a bag-shaped liquid container is often used as a container for storing a liquid such as ink.

It is also known well that since a color material is included in a liquid such as ink used for printing, and the color material component precipitates along with the elapsation of time. In such a case, the ink concentration in the bag-shaped container is uneven, and this may affect the image quality of a product printed using it. It is therefore necessary to stir the ink in the bag-shaped container.

One way to stir the ink is to repetitively press the bag-shaped container using a spring-biased press plate. Additionally, in recent years, multicolor inks are used to improve image quality, or a plurality of tanks are prepared for a single color to improve productivity. To cope with such a situation, formation of multistage mechanisms for stirring in bag-shaped tanks is necessary.

As an example of such a stirring apparatus, Japanese Patent Laid-Open No. 2020-131648 discloses an inkjet printing apparatus in which a motor is installed in each stage to drive a press plate.

In Japanese Patent Laid-Open No. 2020-131648, however, since a motor is installed in each stage to drive a press plate, motors/transmission drive systems/electric wires increase in proportion to the number of stages. For this reason, there is demand for a configuration for driving the press plates in the stages together. In this case, a large driving force for driving the press plates of the plurality of stages together against the spring biasing forces thereof is necessary, and the motor becomes bulky. As a result, the space efficiency of the liquid supply apparatus lowers, or the manufacturing cost increases.

SUMMARY OF THE INVENTION

The present invention has been made in consideration of the above-described problem, and improves the space efficiency of a liquid supply apparatus having a stirring function using a bag-shaped liquid container.

According to an aspect of the present invention, a liquid supply apparatus comprises a holding member configured to detachably hold, with respect to the liquid supply apparatus, a tray on which a flexible container provided with a supply port for supplying a liquid to a printhead is placed, a press member configured to press the container attached to the liquid supply apparatus, a movable member configured to move the press member to a first position where the press member presses the container and a second position where a press amount of the press member for the container is less than at the first position; a first spring having one end locked on the press member and the other end locked on the holding member, and a second spring having one end locked on the press member and the other end locked on the movable member.

Further features of the present invention will become apparent from the following description of exemplary embodiments with reference to the attached drawings.

BRIEF DESCRIPTION OF THE DRAWINGS

FIGS. 11A to 11C are views showing a detailed shape of a portion near the press unit;

FIG. 12 is a perspective view of the portion near the press unit;

FIG. 22 is a view showing an operation of an elevating plate and a state of a press plate;

DESCRIPTION OF THE EMBODIMENTS

Figure 1:
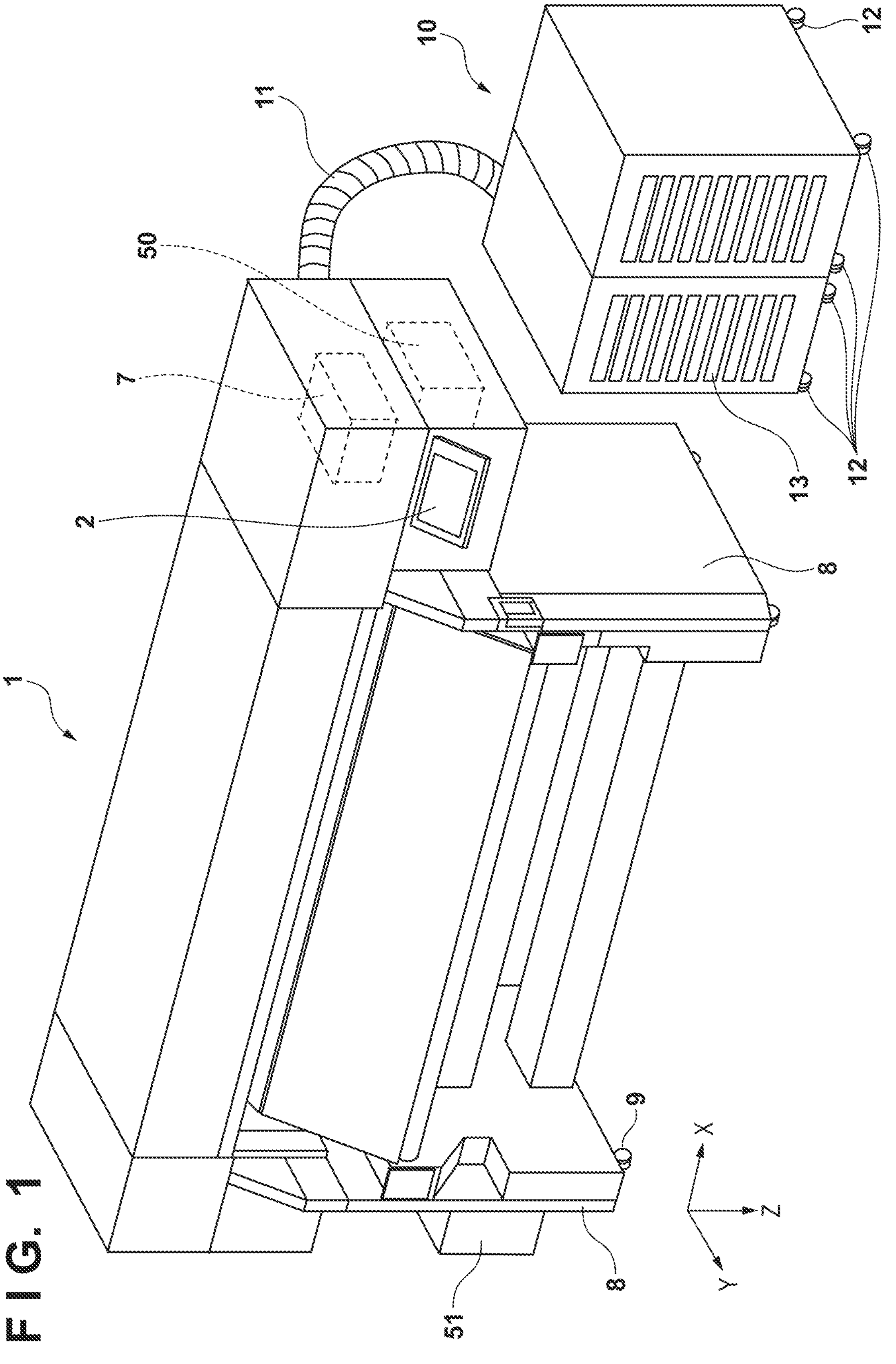
FIG. 1 is a perspective view of a printing apparatus and a liquid supply apparatus.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 2A:
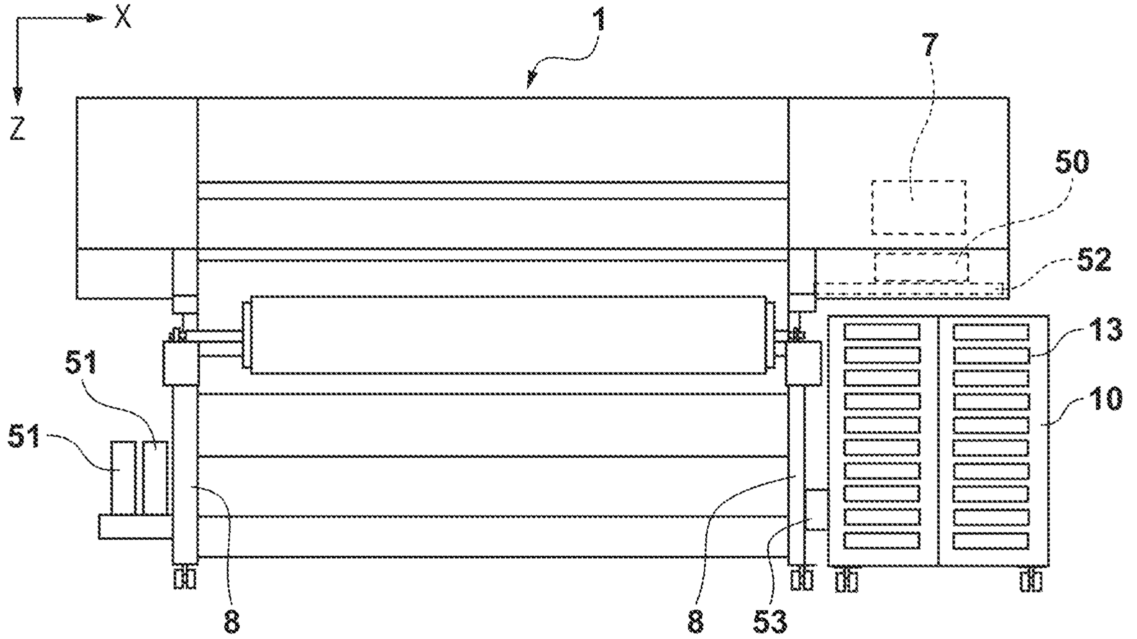
FIGS. 2A and 2B are a front view and a side sectional view, respectively, of the printing apparatus and the liquid supply apparatus.
Figure 2B:
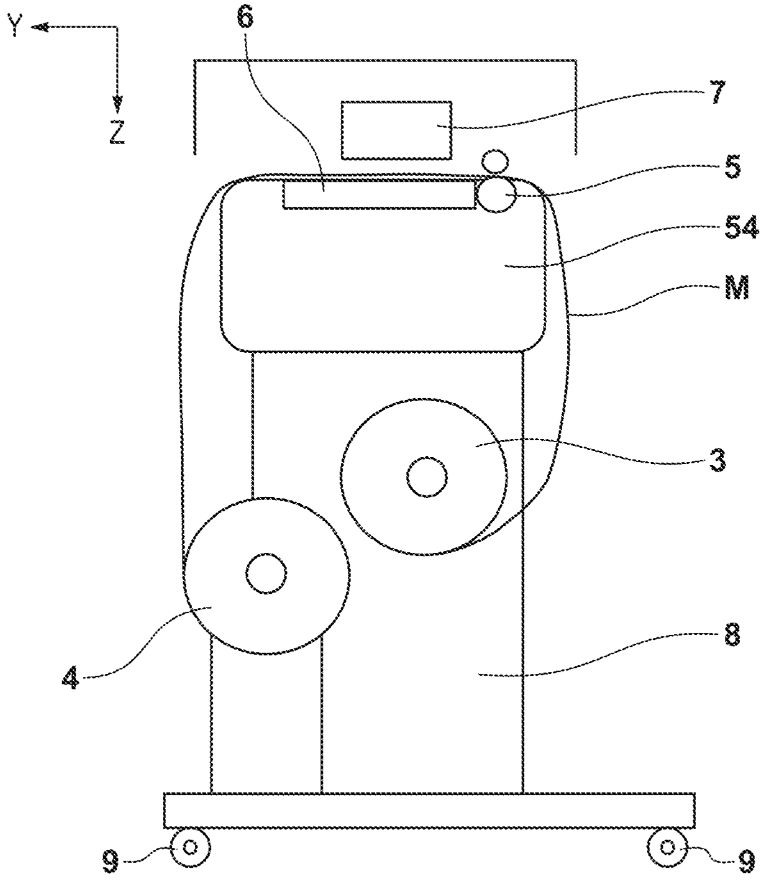

FIG. 1 is a perspective view of a printing apparatus and a liquid supply apparatus connected to the printing apparatus. FIGS. 2A and 2B are a front view and a side sectional view, respectively, of the printing apparatus and the liquid supply apparatus.

In this embodiment, a description will be made defining the left-right direction when a printing apparatus 1 is installed on a horizontal surface as the X direction, the front-back direction as the Y direction, and the upward-downward direction as the Z direction. Note that the right side when the printing apparatus 1 is viewed from the front is defined as the +X direction, the left side as the −X direction, the near side as the +Y direction, the far side as the −Y direction, the lower side (downward in the gravity direction) as the +Z direction, and the upper side as the −Z direction.

In the printing apparatus 1, a housing 54, a paper feed unit 3, and a winding unit 4 are installed on stands 8 to which casters 9 are attached. In the housing 54, units associated with print, such as a conveyance unit 5, a platen 6, a printhead 7, and a recovery unit 50 are arranged. In the paper feed unit 3, a print medium M wound in a roll is installed. The roll-shaped print medium M is conveyed by the conveyance unit 5, and the printhead 7 discharges ink to the print medium M on the platen 6, thereby printing an image. Also, on an operation panel 2, various kinds of settings and print jobs associated with print can be confirmed.

The printhead 7 discharges ink from an orifice using a discharge energy generation element such as an electrothermal transducer (heater) or a piezoelectric element. If an electrothermal transducer is used, ink is foamed by generating heat, and the ink can be discharged from an orifice using the foaming energy. The printhead 7 is not limited to the inkjet method. In addition, the printing method is not limited and, for example, a serial scan method or a full-line method may be used. In the serial scan method, an image is printed by the conveyance operation of the print medium M and scan of the printhead 7 in the X direction crossing the conveyance direction of the print medium M. In the full-line method, an image is printed using the long printhead 7 extending in the X direction crossing the conveyance direction of the print medium M while continuously conveying the print medium M. In this embodiment, a detailed description will be made mainly using the serial scan method as an example.

The print medium M with the printed image is wound by the winding unit 4. If the print operation is ended, the user cuts the print medium using scissors in some cases, but it may be cut by a cutter (not shown).

Also, outside the image forming region on the +X direction side of the printing apparatus 1, the recovery unit 50 is arranged in the housing 54, and preliminary discharge of the printhead 7 or maintenance by suction in the serial scan method can be performed. To hold the paper feed unit 3 and the winding unit 4, both of which are very heavy, while supporting the housing 54, the stands 8 are arranged at positions in the +X direction slightly outside with respect to the width of the print medium M. Also, to arrange the recovery unit 50, the housing 54 is formed to jut out outward in the +X direction with respect to the stand 8.

In addition, a carriage motor 1419 (see FIG. 14) that operates a carriage configured to scan with the printhead 7 mounted thereon is arranged outside the print medium M in the −X direction on the opposite side. A conveyance motor 1417 (see FIG. 14) that drives the conveyance unit 5 is also arranged. For this reason, the housing 54 juts out slightly outward in the −X direction with respect to the stand 8, although not to the extent on the +X side on which the recovery unit 50 is arranged.

Here, a liquid, such as ink to be discharged from the printhead 7 is supplied from a liquid supply apparatus 10. As the liquid to be supplied, various liquids, for example, solvent-based inks such as aqueous ink, latex ink, and eco solvent are assumed. All these inks have a problem that a pigment component (color material) blended in the ink precipitates along with the elapse of time. The particle size of a pigment, the type and amount of an additive, and the like, may be different between ink colors, and, depending on colors, some inks precipitate at a very high speed. It is also assumed that, like ink, a reaction liquid that is discharged from the printhead 7, reacts with ink, and fixes it to the surface of the print medium M is supplied from the liquid supply apparatus 10.

The liquid supply apparatus 10 can be moved on the floor because casters 12 are attached to it, like the printing apparatus 1. A plurality of tray holding units 13 are arranged in the liquid supply apparatus 10, and a tank 40 (see FIG. 3) to be described later, in which a liquid such as ink is stored, is set in each tray holding unit 13. A channel formed by a flexible tube is connected to each tank (liquid container) 40, and the tubes are placed in a duct hose 11. The duct hose 11 is connected from the back surface side of the liquid supply apparatus 10 to the back surface side of the printing apparatus 1, and each tube is connected to a channel in the printing apparatus 1 and communicates with the printhead 7. A channel from the tank 40 to the printhead 7 is thus formed.

The height of the liquid supply apparatus 10 according to this embodiment is set to be lower than the lower surface of the housing 54 projecting to the +X side of the printing apparatus 1. Hence, as shown in FIG. 2A, the liquid supply apparatus 10 can be fitted under the housing 54. The liquid supply apparatus 10 can be brought close up to a position in the X direction where it contacts the stand 8. If a connecting member 53 is used, the liquid supply apparatus 10 can be fixed to the stand 8, and these can integrally be moved when moving the printing apparatus 1.

Defining a unit including multistage (a plurality of) tray holding units 13 as one building in the Z direction, the liquid supply apparatus 10 can hold many tanks 40 in the Z direction even if it includes one building. However, in this embodiment, since two buildings are provided in the X direction, more tanks 40 can be held. If the number of ink colors is increased for the purpose of improving image quality, or the number of ink tanks of a single color is increased for higher productivity, the number of buildings can be increased to two columns, three columns, . . . , in the X direction. In this case, if the liquid supply apparatus 10 is caused to partially or wholly overlap the printing apparatus 1 in the X direction, an increase of the installation size can be suppressed. Also, if the liquid supply apparatus 10 includes tanks corresponding to only one building, it can completely be fitted within the size of the printing apparatus 1 in the X direction. If the liquid supply apparatus 10 includes two or more buildings, it is slightly projected from the printing apparatus 1 in the X direction. For this reason, as will be described later in detail, the size of the liquid supply apparatus 10 in the X direction is preferably reduced.

In this embodiment, a configuration in which if the number of buildings is two, the liquid supply apparatus 10 projects from the printing apparatus has been described. However, in a case when the size of the tank 40 in the X direction is small, or in a case where the recovery unit 50 is larger than in this embodiment, and the housing 54 further juts out in the +X direction, the liquid supply apparatus 10 may not project from the housing 54 in the X direction even if the liquid supply apparatus 10 is formed by a plurality of buildings.

In this embodiment, a waste liquid cartridge 51 is installed on a side surface (−X side) of the printing apparatus 1 on the opposite side of the liquid supply apparatus 10. Like the liquid supply apparatus 10, if the waste liquid cartridge 51 is installed on the lower side of the housing 54 jutting out to the −X side, an increase of the installation area of the whole apparatus can be suppressed. To cause waste ink sucked by the recovery unit 50 to flow to the waste liquid cartridge 51, the waste liquid cartridge 51 is arranged near the recovery unit 50 in some cases. In this embodiment, however, preferring to keep the installation area of the whole apparatus small, the waste liquid cartridge 51 is installed at the end on the −X side. In addition, a tank 40 that is the same as the ink tank is used as a container for a maintenance liquid used in the recovery unit 50 and set in the liquid supply apparatus 10.

Figure 3A:
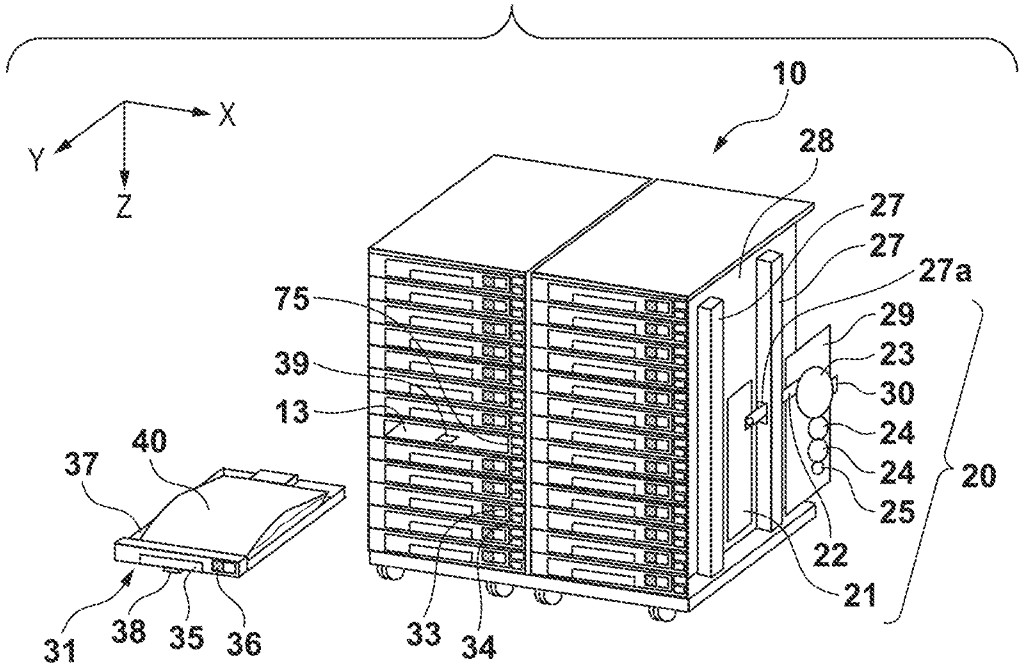
FIGS. 3A to 3C are perspective and side views of the liquid supply apparatus.
Figure 3B:
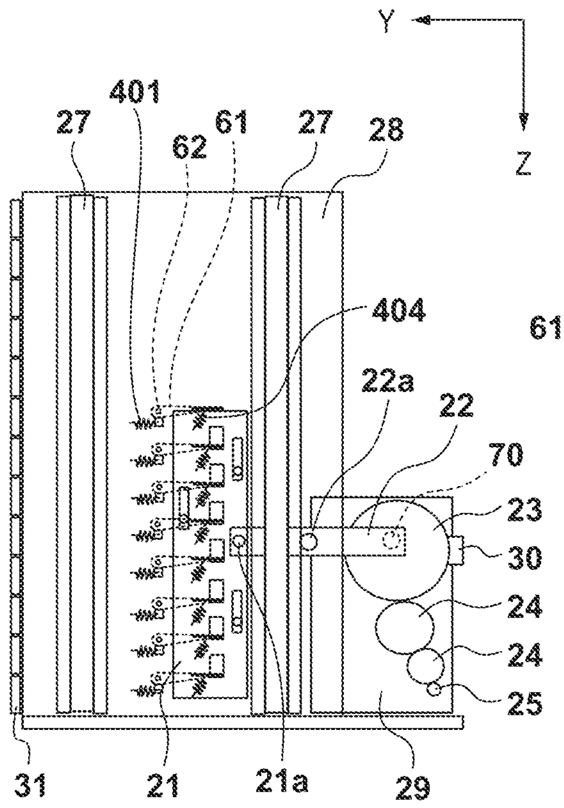
Figure 3C:
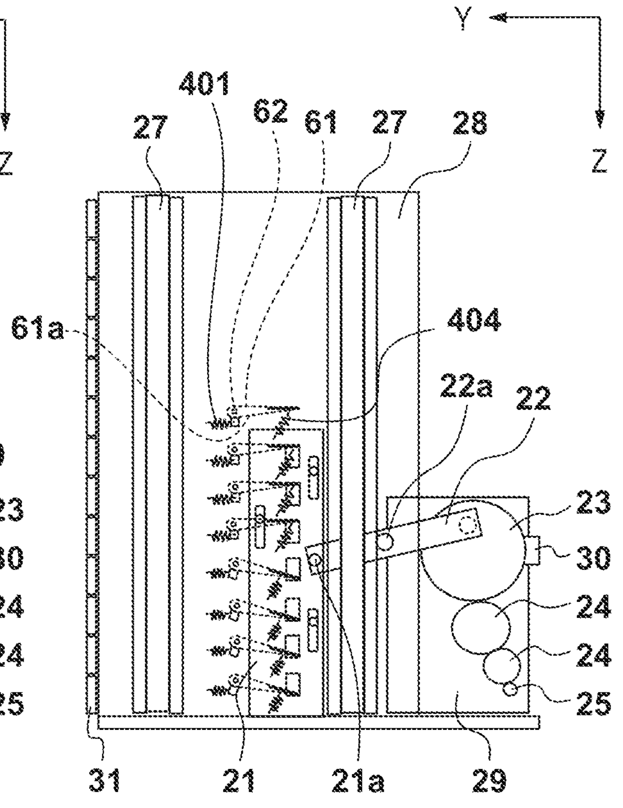

FIGS. 3A to 3C are views showing the outer appearance of the liquid supply apparatus 10. FIG. 3A is a perspective view showing the outer appearance of the liquid supply apparatus, FIG. 3B is a side view showing a press cancel state, and FIG. 3C is a side view showing a press state. The structure of the liquid supply apparatus 10 will be described in more detail with reference to these drawings. The liquid supply apparatus 10 is originally surrounded by an outer package. FIGS. 3A to 3C show a state in which the outer package is partially removed to show the internal structure. Also, a state in which some trays 31 are pulled out is illustrated to show the relationship between the trays 31 and the tray holding units (holding members) 13.

The tray 31 includes a tank receiving portion 37 that holds the tank 40, and can detachably be set to the tray holding unit 13. In a set state, a projection 38 projecting from the lower surface of a tray grip 35 engages with a concave portion 39 provided in the tray holding unit 13. This prevents the tray 31 from coming out even if an operation of applying a vibration to the apparatus is performed by, for example, moving the liquid supply apparatus 10. To detach the tray 31, when the user operates the tray grip 35, the interlocked projection 38 rises, and the engagement with the concave portion 39 is canceled. A lock operation unit 36 is provided to prevent the user from unintentionally pulling out the tray 31 in the set state.

The lock operation unit 36 is installed to be movable in the X direction by an operation of the user. If the lock operation unit 36 is moved to the +X side, a lock state is obtained, and if the lock operation unit 36 is moved to the −X side, a lock cancel state is obtained. A lock detection sensor 75 is provided on the +X side of the tray holding unit 13. The lock detection sensor 75 can detect the lock state and the lock cancel state based on the positional relationship to a sensor flag (not shown) connected to the lock operation unit 36. In the lock state, the lock operation unit 36 keeps the tray grip 35 in a state in which the projection 38 bites into the concave portion 39, the engagement of the projection 38 cannot be canceled. In the lock cancel state, the lock operation unit 36 does not regulate the operation of the tray grip 35. For this reason, the user can raise the projection 38 by operating the tray grip 35, and pull out the tray 31.

Figures 4A, 4B:
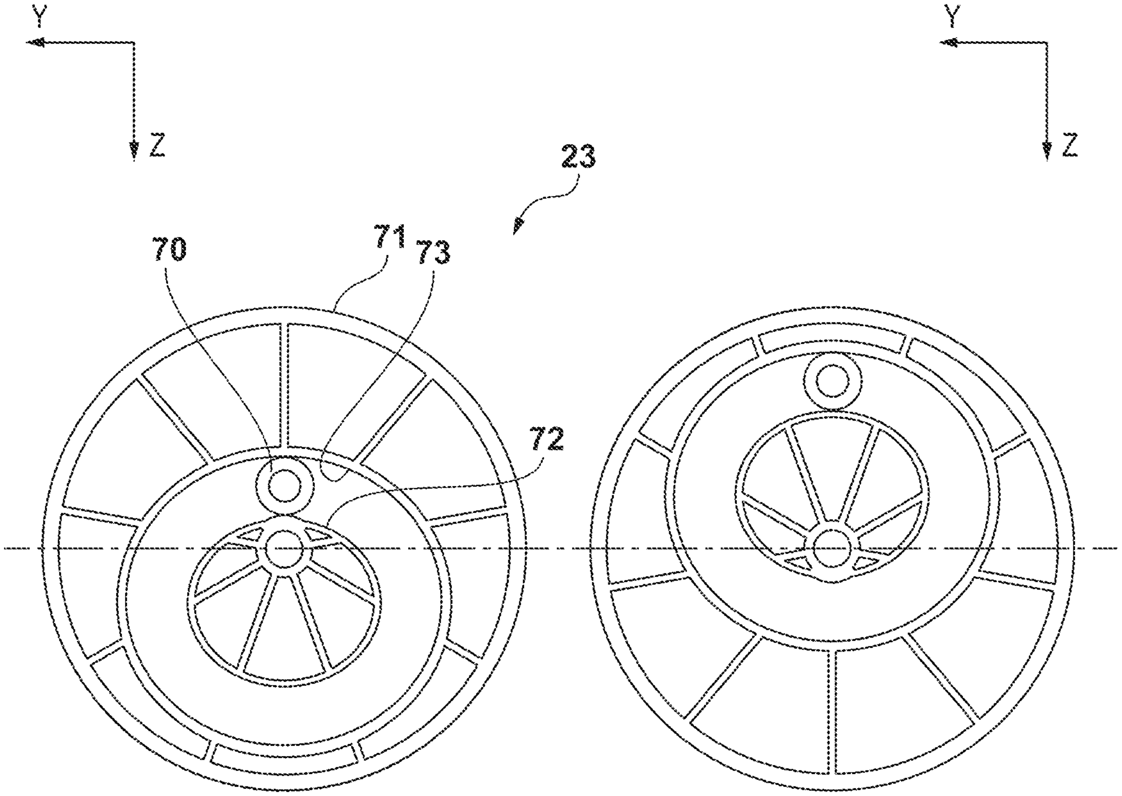
FIGS. 4A and 4B are enlarged views of a cam.

FIGS. 4A and 4B are enlarged views of a cam. A configuration around a stirring drive mechanism will be described here with reference to FIGS. 1 to 3A to 3C as well. A stirring drive unit 20 configured to stir ink in the tanks 40 is provided on a side surface of the liquid supply apparatus 10. The configuration of the stirring drive unit 20 will be described here.

The stirring drive unit 20 moves an elevating plate 21 up and down, thereby driving a plurality of stages of press plates 61 at once. A press unit elevating motor 25 transmits a driving force to a cam 23 via a plurality of gears 24. In the cam 23, a gear teeth portion 71 meshes with the gear 24, and the cam 23 rotates along with the rotation of the gears 24. Also, the cam 23 includes an inner cam surface 72 and an outer cam surface 73, and a cam follower 70 connected to a drive transmission lever 22 is arranged therebetween. The inner cam surface 72 is located inside the cam follower 70 in the radial direction of the cam 23, and when the cam 23 rotates, the inner cam surface 72 comes into contact with the cam follower 70 and makes an action to raise it. The outer cam surface 73 is located outside the cam follower 70 in the radial direction of the cam 23, and when the cam 23 rotates, the outer cam surface 73 comes into contact with the cam follower 70 and acts to lower it. Note that a rotation detection sensor 30 that detects the rotation of the cam 23 is arranged near the cam 23 (see FIGS. 3A to 3C). The rotation detection sensor 30 uses a photointerrupter and is arranged such that a flag provided on the cam 23 shields the rotation detection sensor once per rotation.

If the cam follower 70 moves up and down along with the rotation of the cam 23, the drive transmission lever 22 pivots about a pivot shaft 22*a*. Since the drive transmission lever 22 is connected to an elevating plate shaft portion 21*a* provided on the elevating plate (movable member) 21, the operation of the drive transmission lever 22 is converted into an elevating operation of the elevating plate 21. If the cam 23 makes one rotation, the cam follower 70 performs one reciprocal operation in the elevating direction, and the elevating plate 21 similarly performs one reciprocal elevating operation via the drive transmission lever 22.

The elevating plate 21 is attached to a side plate 28 to be elevatable in the Z direction. Also, two front and rear columns 27, each of which has a U-shaped cross section and extends in the Z direction are fixed to the side plate 28. The columns 27 are attached to the side plate on the −X side as well, and a total of four columns per building ensure the strength of the structure. This can support the weight of the multistage ink tanks.

The columns 27 have a high strength but a thickness, too. Hence, if the stirring drive unit 20 is provided outside the columns 27 attached to the side plate 28 in the +X side, the size in the X direction becomes large. To prevent this, in this embodiment, drive units such as the elevating plate 21 and the cam 23 are divisionally arranged on the front and rear sides of the rear column 27, and the drive transmission lever 22 is arranged to be inserted into a through hole 27*a* provided in the column 27. This makes it possible to arrange the stirring mechanism while ensuring the strength and suppressing an increase of the size in the X direction.

Furthermore, the drive transmission lever 22 is attached to a drive holding plate 29 that supports the stirring drive unit 20, and, when fastening screws, or the like, are removed, the drive transmission lever 22 and the stirring drive unit 20 can be detached as an integral unit to the back surface side with respect to the elevating plate shaft portion 21*a*. With this configuration, part replacement by a serviceman can be facilitated. Particularly, in a case when a plurality of buildings are connected, normally, access to the stirring drive unit 20 or the drive transmission lever 22 is possible only when an adjacent building is disconnected. However, if the units can be removed from the back surface, a maintenance work, and the like, are easy. In this case, fastening screws, and the like, used to attach the drive holding plate 29 to the housing of the liquid supply apparatus 10 are preferably fastened not from the side surface, but from the back surface side.

A mechanism of power transmission from the elevating plate 21 to the press plate (press member) 61 will be described here with reference to FIGS. 3B and 3C. As described above, FIG. 3B shows the press cancel state, and FIG. 3C shows the press state.

The press plate 61 of each stage receives a load by two springs and presses the tank 40. A first press spring 401 has one end locked on the press plate 61 and the other end locked on the tray holding unit 13. A second press spring 404 has one end locked on the press plate 61 and the other end locked on the elevating plate 21. The press plate 61 is attached such that it can pivot with respect to the tray holding unit 13 using a pivot shaft 62 as the pivot center. Both the two springs bias the press plate 61 in a direction in which the press plate 61 pivots clockwise with respect to FIGS. 3B and 3C. If the press plate 61 is in the press cancel state (FIG. 3B), the elevating plate 21 contacts the press plate 61 and raises it, and the load by the second press spring 404 is applied between the elevating plate 21 and the press plate 61. For this reason, the load by the second press spring 404 is closed between the elevating plate 21 and the press plate 61 (changes to the internal force of the elevating plate 21) and does not act as a load on the stirring drive unit 20. That is, the load applied to the stirring drive unit 20 in the press cancel state includes only the load of the first press spring 401 and the dead weight of the components.

When the press plate 61 is in the press state (FIG. 3C), the cam 23 is in a phase opposite by 180° to the press cancel state, and a press surface 61*a* of the press plate 61 is in contact with the tank 40 and presses it. In FIG. 3C, four stages on the upper side show a case when the tank 40 is full, and four stages on the lower side show a collapsed state of the tank 40 in which ink is about to be used up. The loads of both the first press spring 401 and the second press spring 404 and the dead weight of the components are applied to the tank 40. At this time, the load of the first press spring 401 is applied to the tank 40 but not to the elevating plate 21. The load of the second press spring 404 is applied between the tank 40 that the second press spring 404 contacts via the press plate 61 and the elevating plate 21. The cam 23 acts to lower the elevating plate 21 to the lower side with respect to the tank 40. In this way, using the two springs attached to different positions and the cam 23 capable of making both upward movement and downward movement, the load applied to the stirring drive unit 20 at the time of an operation is reduced.

Note that, in the press state, if the remaining ink amount in the tank 40 is small, and the tank is collapsed, the expansions of the first press spring 401 and the second press spring 404 are small, and, therefore, the load applied to the tank 40 is small. If the remaining ink amount in the tank 40 is great, a reaction force from the tank 40 is readily received at the time of press, and a large load is needed to press the tank and push it in deep. To the contrary, if the remaining amount is small, the reaction force from the tank 40 is small. Hence, even if the pressing force is small, the tank 40 can easily be deformed to move ink. For this reason, the springs are arranged at such positions that the load decreases as the tank shrinks. This obviates the need to make the spring pressure greater than necessary. In this embodiment, the load applied to the press surface 61*a* is adjusted such that it is about 500 gf in a state in which the tank 40 is full, and about 300 gf in a state in which ink is about to be used up. Note that, since the springs are arranged in each stage, an optimum pressing force can be applied to each tank even if the remaining amount in the tank 40 of each stage is different.

The stirring drive unit 20 is arranged on a side surface of each building. In a two-building structure as shown in FIGS. 3A to 3C, one stirring drive unit is arranged on each building, that is, a total of two stirring drive units are provided in the liquid supply apparatus 10.

Next, FIGS. 5A to 5D are views showing the relationship between the rotation phase of the cam 23 and the pivotal position of the drive transmission lever 22.

Figure 5A:
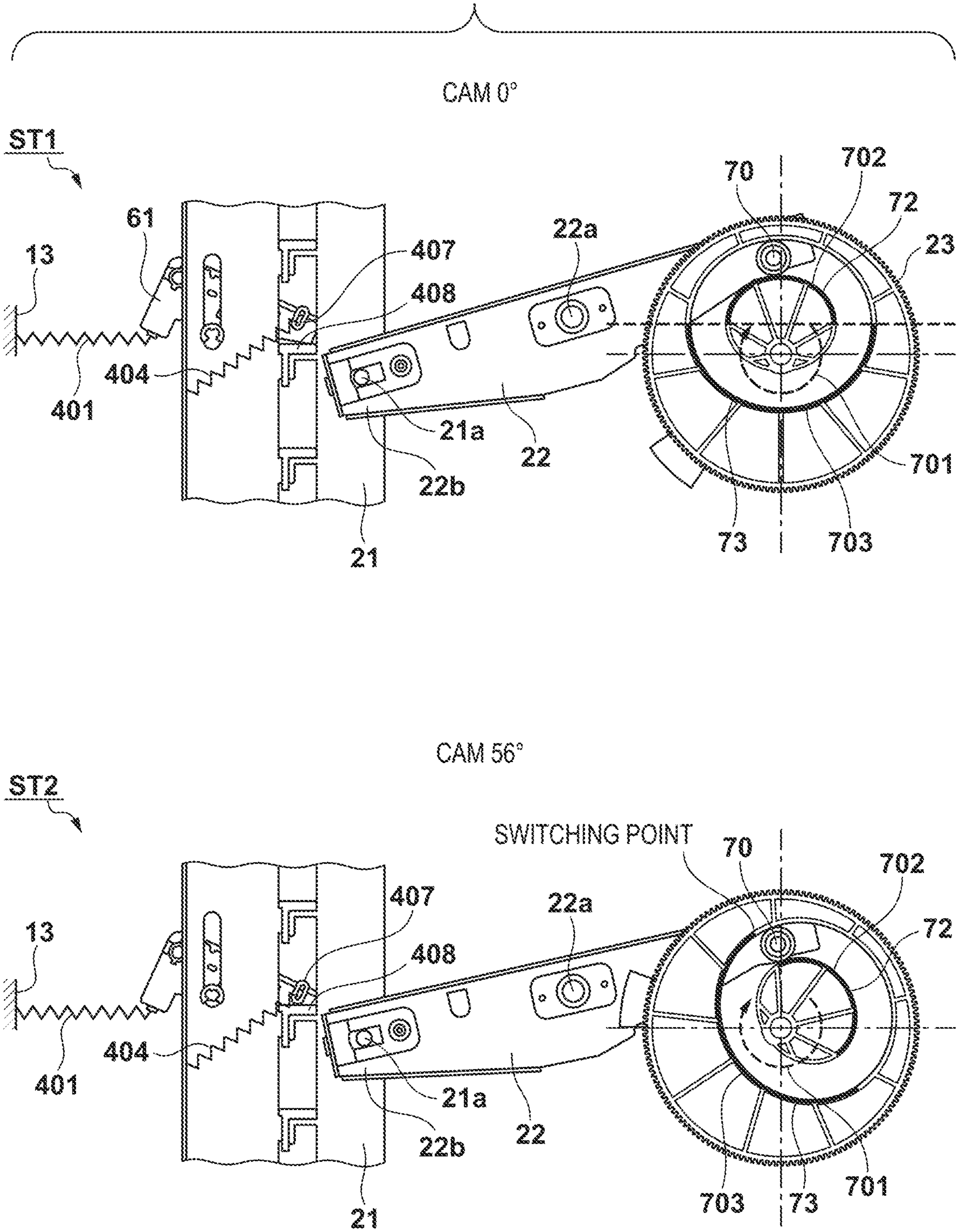
FIG. 5A is a view showing the relationship between the rotation phase of the cam and the pivotal position of a drive transmission lever.

As described above, the cam 23 includes the inner cam surface 72 that raises the cam follower 70, and the outer cam surface 73 that lowers the cam follower 70, and rotates clockwise as indicated by an arrow 701 in FIG. 5A. The inner cam surface 72 and the outer cam surface 73 are configured to perform raising and lowering of the cam follower 70 in regions about ½ (about 180°) of one rotation of the cam 23, respectively, to disperse the load. In FIG. 5A, a region indicated by a thick solid line 702 is an action region where the inner cam surface 72 raises the cam follower 70, and a region indicated by a thick solid line 703 is an action region where the outer cam surface 73 lowers the cam follower 70.

In a state indicated by ST1 in FIG. 5A in which the rotation phase of the cam 23 is 0°, the cam follower 70 is located at the highest position, and a distal end 22*b* of the drive transmission lever 22 is located at the lowest position. In this state, the elevating plate 21 is located at the lowest position, and an elevating plate abutting portion 408 of the elevating plate 21 is apart from a press plate abutting portion 407 of the press plate 61 and does not support the press plate abutting portion 407. For this reason, the press plate 61 presses the tank 40 by the biasing forces of the first press spring 401 connected to the tray holding unit 13 and the second press spring 404 connected to the elevating plate 21. Also, in this state, since the biasing force of the second press spring 404 acts as a force for raising the elevating plate 21, the biasing force of the second press spring 404 serves as a load of the lowering operation of the elevating plate 21, and the cam follower 70 is biased to contact the inner cam surface 72.

In a state indicated by ST2 in FIG. 5A in which the rotation phase of the cam 23 is about 56°, the cam follower 70 slightly lowers from the highest position, and the distal end 22*b* of the drive transmission lever 22 is located at a position slightly raised from the lowest point. In this state, the elevating plate 21 is slightly raised from the lowest position by the biasing force of the second press spring 404, and the elevating plate abutting portion 408 of the elevating plate 21 abuts against the press plate abutting portion 407 of the press plate 61. That is, the biasing force of the second press spring 404 changes from the force for raising the elevating plate 21 to the internal force of the elevating plate 21, and is not a load on the upward/downward movement of the elevating plate 21 anymore. If the elevating plate abutting portion 408 of the elevating plate 21 contacts the press plate abutting portion 407 of the press plate 61, the cam follower 70 switches from a state in which it is supported by the inner cam surface 72 to a state in which it is lowered by the outer cam surface 73. Also, since the state changes from this position to a state in which the elevating plate abutting portion 408 of the elevating plate 21 raises the press plate abutting portion 407 of the press plate 61, the biasing force of the second press spring 404 does not act on the tank 40 anymore. Then, the biasing force of the first press spring 401 acting on the press plate 61 and the dead weight of the press plate 61 serve as a load on the upward movement of the elevating plate 21.

Figure 5B:
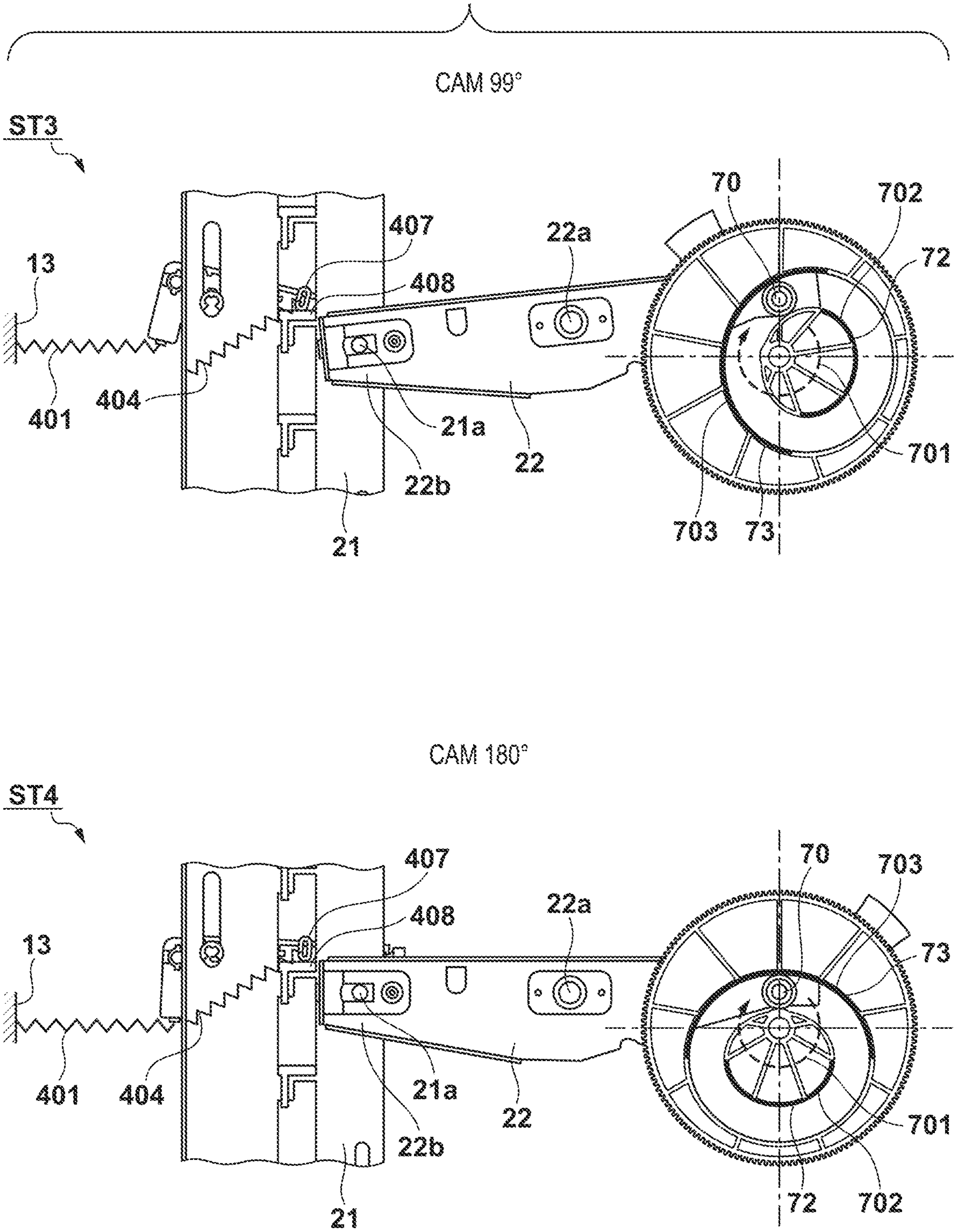
FIG. 5B is a view showing the relationship between the rotation phase of the cam and the pivotal position of the drive transmission lever.

In a state indicated by ST3 in FIG. 5B in which the rotation phase of the cam 23 is about 99°, the cam follower 70 is located at a position slightly higher than the lowest point, and this state is halfway through raising the elevating plate 21. Even in this state, the biasing force of the first press spring 401 and the dead weight of the press plate 61 serve as a load of the upward movement of the elevating plate 21. The biasing force of the second press spring 404 changes to the internal force of the elevating plate 21 and therefore does not serve as a load of the upward movement of the elevating plate 21.

In a state indicated by ST4 in FIG. 5B in which the rotation phase of the cam 23 is about 180°, the cam follower 70 is located at the lowest point, and the distal end 22*b* of the drive transmission lever 22 is located at the highest position. In this state, press of the tank 40 by the press plate 61 is canceled.

Figure 5C:
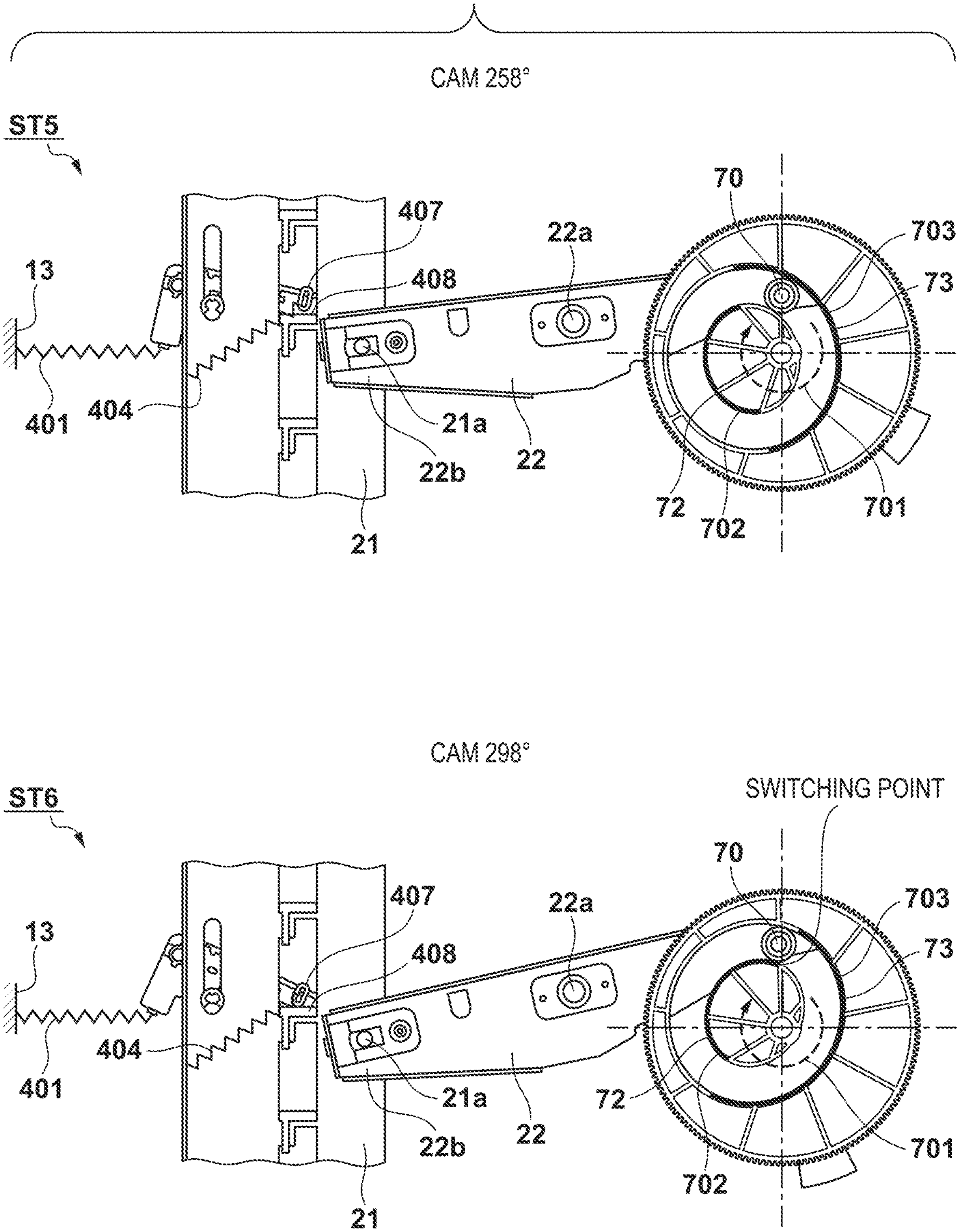
FIG. 5C is a view showing the relationship between the rotation phase of the cam and the pivotal position of the drive transmission lever.

In a state indicated by ST5 in FIG. 5C in which the rotation phase of the cam 23 is about 258°, the cam follower 70 slightly rises from the lowest point, and the distal end 22*b* of the drive transmission lever 22 is located at a position slightly lower than the highest position. In this state, the press plate 61 starts pressing the tank 40 by the biasing force of the first press spring 401.

In a state indicated by ST6 in FIG. 5C in which the rotation phase of the cam 23 is about 298°, the cam follower 70 further rises from the state ST5 shown in FIG. 5C, and the distal end 22*b* of the drive transmission lever 22 is located at a position slightly lower than the state ST5 shown in FIG. 5C. In this state, abutment of the elevating plate abutting portion 408 of the elevating plate 21 to the press plate abutting portion 407 of the press plate 61 is just canceled. That is, the biasing force of the second press spring 404 changes from the internal force of the elevating plate 21 to the force for pressing the tank 40, and the biasing force of the second press spring 404 changes to the load of the downward movement of the elevating plate 21. Along with cancellation of the abutment of the elevating plate abutting portion 408 to the press plate abutting portion 407, by the biasing force of the second press spring 404, the cam follower 70 is switched from a state in which it is in contact with the outer cam surface 73 to a state in which it is supported by the inner cam surface 72.

Figure 5D:
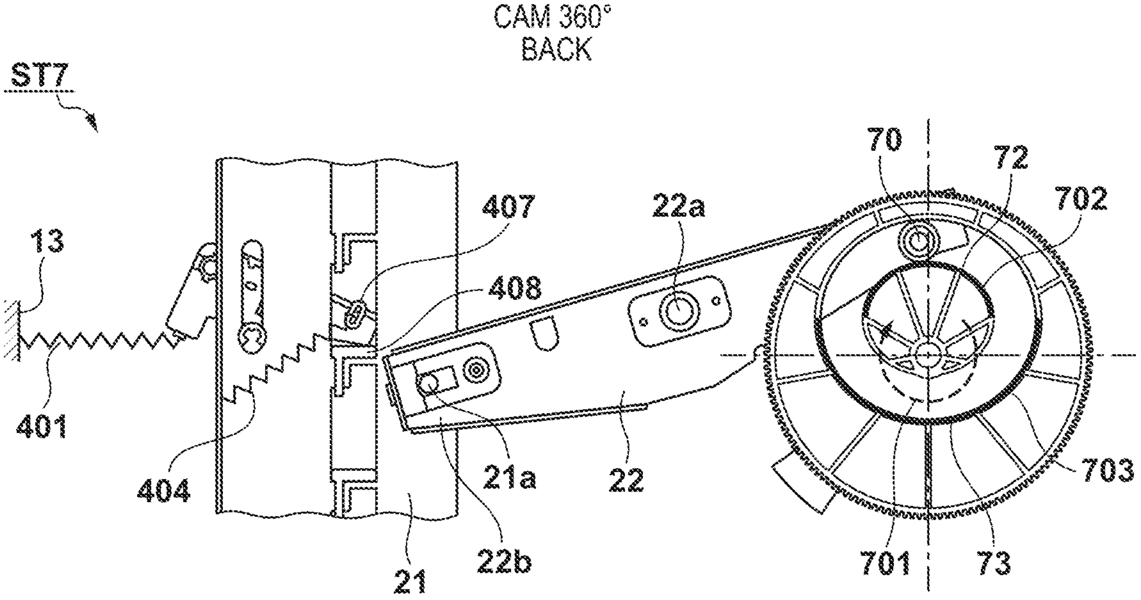
FIG. 5D is a view showing the relationship between the rotation phase of the cam and the pivotal position of the drive transmission lever.

ST7 in FIG. 5D indicates a state in which the cam 23 makes one rotation and the rotation phase changes to 360°, that is, a state in which the cam 23 returns to the same position as that at 0° in ST1 shown in FIG. 5A. In this state, the tank 40 is pressed by the biasing forces of the first press spring 401 connected to the tray holding unit 13 and the second press spring 404 connected to the elevating plate 21.

As described with reference to FIGS. 5A to 5D, in this embodiment, the first press spring 401 and the second press spring 404, which press the tank 40, are provided. Consideration is made to prevent the second press spring 404 from becoming a load on the stirring drive unit 20 when canceling press to the tank. Hence, a large driving force for driving the press plates of the plurality of stages together against the spring biasing forces is unnecessary, an increase of the size of the press unit elevating motor 25 can be suppressed, and in turn, the space efficiency of the entire liquid supply apparatus can be improved.

Figure 6:
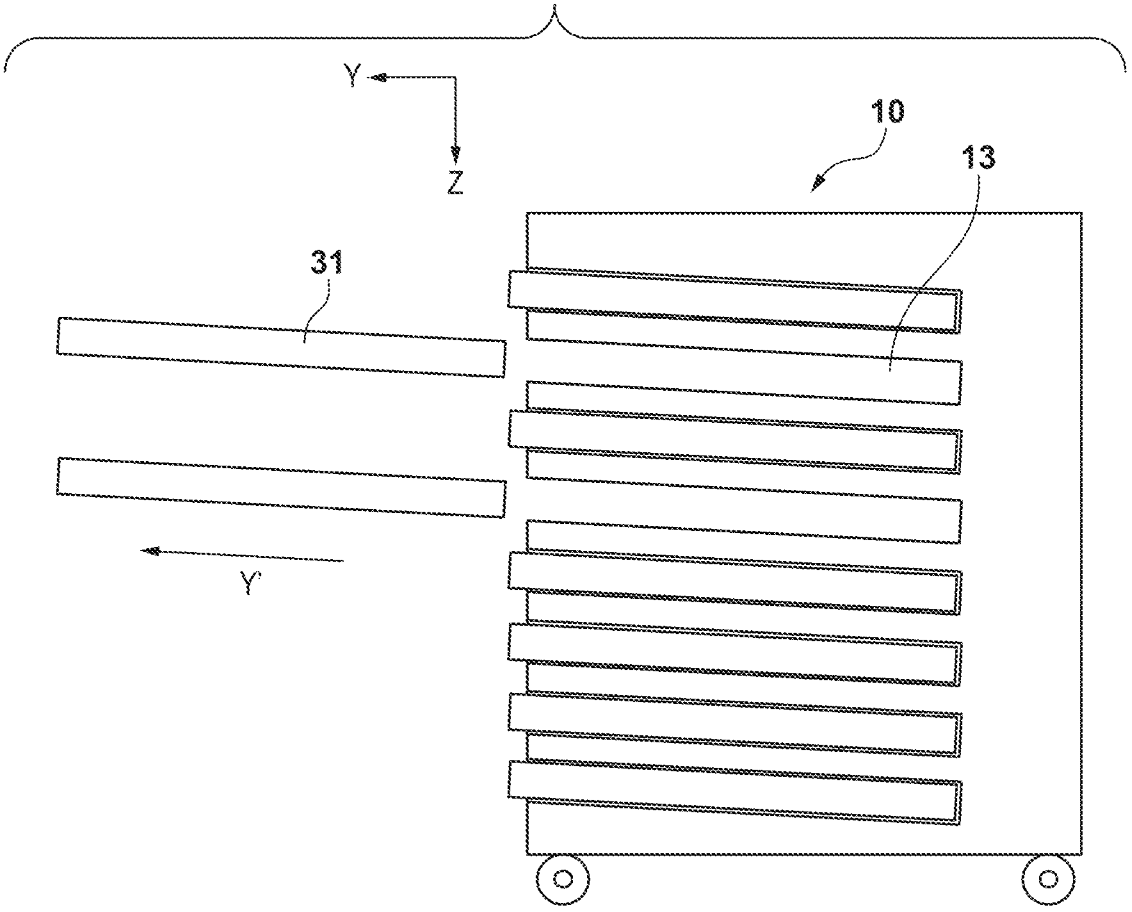
FIG. 6 is an explanatory view of tray holding units in the liquid supply apparatus.

FIG. 6 is an explanatory view of the tray holding units 13 in the liquid supply apparatus 10, which is a simple view of the Y-Z cross section viewed from a side surface side. The tray holding unit 13 of each stage provided in the liquid supply apparatus 10 tilts, and tilts to the lower (+Z) side toward the rear surface (−Y) side. Hence, the tray 31 is held while tilting in a set state. As will be described later concerning the effect, the tilt angle is preferably smaller than 45°, and it is more effective that the angle is 10° or less with respect to a horizontal surface. In this embodiment, the tilt angle is set to 3°.

Figure 7:
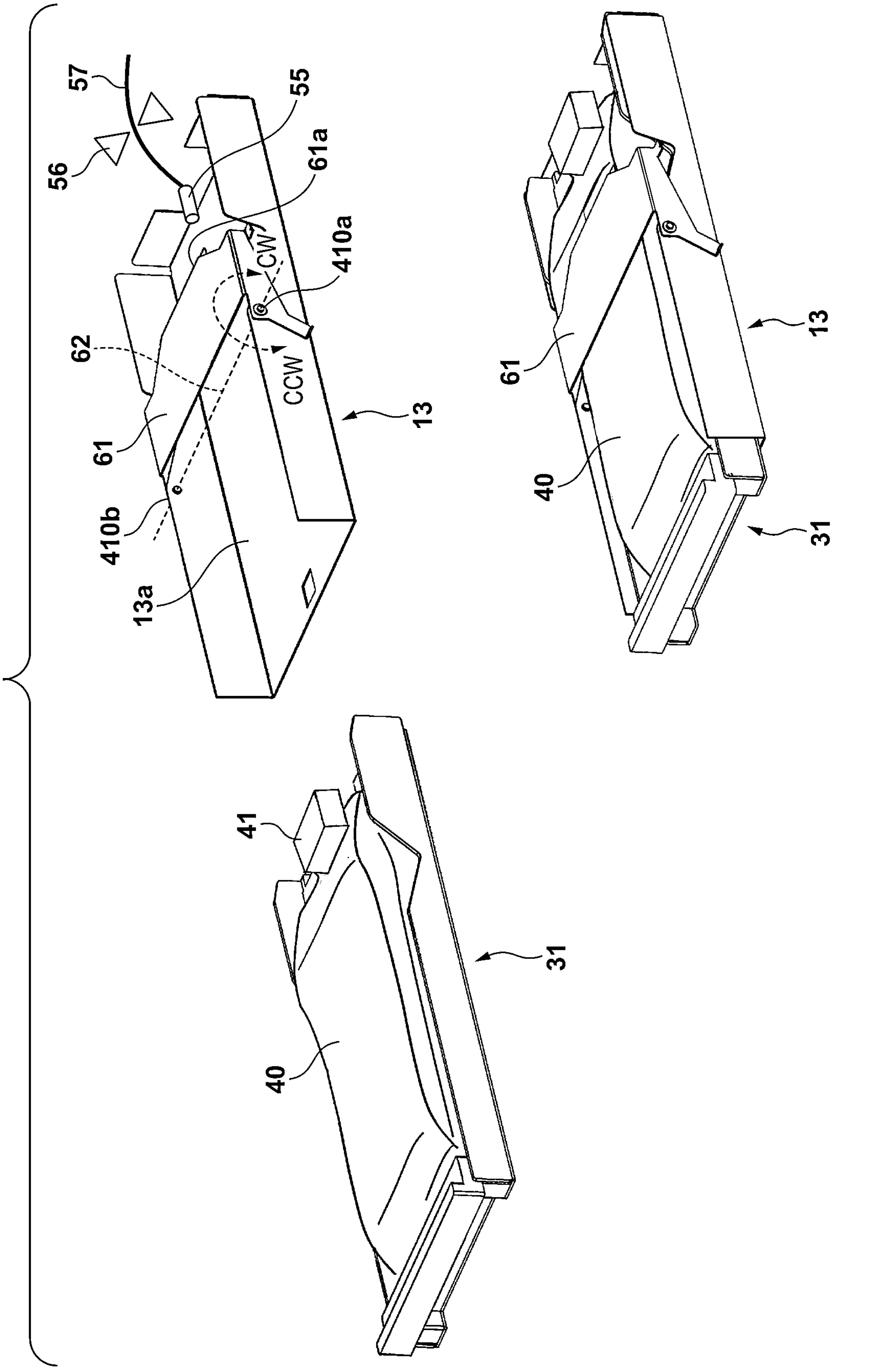
FIG. 7 is a perspective view of a tray holding unit.
Figure 8:
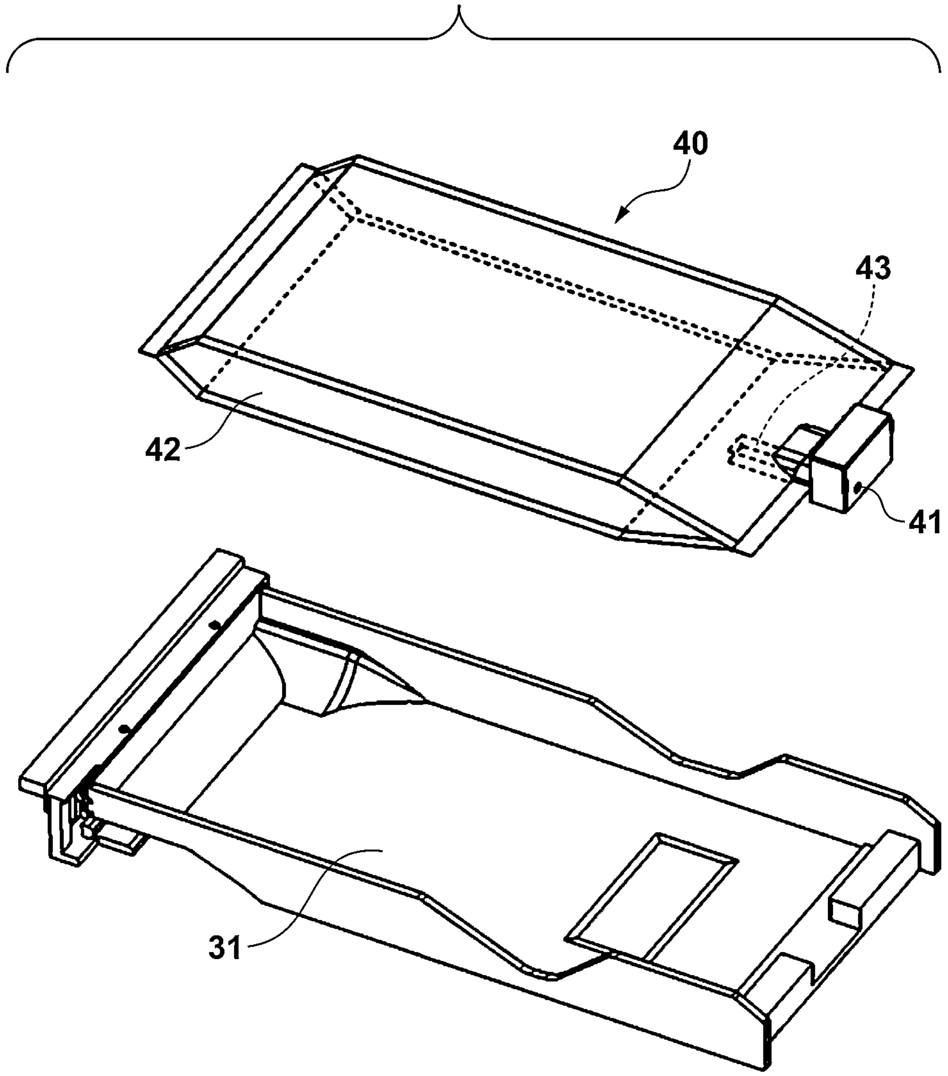
FIG. 8 is a perspective view of a tray and an ink tank.

FIG. 7 is a perspective view of the tray holding unit 13, and only one stage is shown for the sake of clarity. FIG. 8 is a perspective view of the tray 31 and the tank 40 storing ink.

Both the upper and lower surfaces of the tank 40 are formed by flexible members. Also, gusset portions 42 folded inward to increase a liquid holding amount are provided on both side surfaces of the tank 40. A bag-shaped tank is formed by welding these. If the liquid amount remaining inside is large, the gusset portions 42 expand, and if the remaining liquid amount is small, the gusset portions 42 are folded. The shape of the tank 40 changes in accordance with the ink amount.

Normally, the tank 40 is made of a material such as PET and configured to have a structure of a plurality of layers. However, if the liquid inside has a characteristic of hardening as it reacts with air, or there is a fear that the concentration or the remaining amount changes due to evaporation, the flexible members are formed by a layer structure including an aluminum layer, thereby preventing these.

In addition, a supply port 41 is provided on one side of the tank 40, and the supply port 41 is connected to an intake 43 inside the tank. A spring-biased valve is provided inside the supply port 41. When a supply needle portion 55 is inserted, the valve is opened, the liquid reservoir portion of the tank 40 is connected to a channel 57 on the downstream side, and the liquid can be fed to the liquid supply apparatus 10. Also, a channel valve 56 is provided in the channel 57, and closing and opening of the channel can be switched by the operation of a channel valve switching motor 1411 (see FIG. 14). This is linked with the detection state of the lock detection sensor 75 described above. If it is determined that lock of the tray 31 is canceled in a state in which the channel is opened by the channel valve 56 during printing, the channel valve 56 is closed. This can prevent the tank 40 from being drawn out in a state in which the channel valve 56 is open. If the tank is drawn out in a state in which the channel valve 56 is open, air enters from the supply needle portion 55 into the channel, and a problem such as ink hardening in the channel 57 or a discharge failure in the head 7 may occur. Hence, basically, the tray 31 is locked by the above-described lock mechanism. The user unlocks the tray 31 when necessary and shifts the channel valve 56 to a closed state as needed.

Note that, in this embodiment, the length of the side of the tank 40 where the supply port 41 is provided is about 180 mm, and the length of a side (side surface) orthogonal to that is about 400 mm. The tank 40 is depressurized in an empty state to sufficiently remove air, and ink of about 1.5 L is then injected. In this embodiment, the side with the supply port 41 corresponds to the widthwise direction. However, a form in which the side with the supply port 41 corresponds to a longitudinal direction, or the side with the supply port 41 and the side orthogonal to that may have the same lengths can also be considered.

The supply needle portion 55 in which a hole communicating with the channel 57 is formed near the distal end is arranged on one side of the tray holding unit 13. Also, the tray holding unit 13 is provided with the press plate 61. The press plate 61 is biased by the spring pressure in a direction for lowering the −Y side about the pivot shaft 62.

Another configuration can also be considered in which the press plate 61 is installed in the tray 31, and, if the tray 31 is set in the tray holding unit 13, the driving force is transmitted up to the press plate 61, and a pressing operation is possible. This configuration may be employed because the same stirring effect as described above can be obtained even in this configuration. However, when setting the tank 40 in the tray 31, the press plate 61 needs to be avoided, resulting in slight degradation of operability. Hence, operability is higher in the configuration in which the press plate 61 is arranged in the tray holding unit 13.

The press plate 61 is formed by steel sheets of a metal. As compared to a resin member, the strength is high even if thin. It is, therefore, possible to suppress the height of the tray holding unit 13. The pivot shaft 62 of the press plate 61 is arranged outside the tank 40 in the X direction and is provided at a position overlapping the tank in a direction vertical to a holding surface 13*a* of the tray holding unit 13 when the tank 40 is full. With these contrivances for suppressing the size on the Z direction, even if the press plate 61 is installed in the tray holding unit 13 of each stage and imparted with the stirring function, the multistage tanks 40 can be fitted in the limited space under the housing of the printing apparatus 1.

In addition, in the press surface 61*a* of the press plate 61, the size in the X direction is set smaller than the size of the press plate 61 near the pivot shaft 62. This is to prevent, in a case when the press plate 61 pivots, and the press surface 61*a* presses the tank 40, a non-pressed portion of the tank 40 from contacting the press plate 61 and damaging the tank 40. Even if burrs of edge portions are removed, a steel sheet made of a metal may damage the tank 40 if it repetitively contacts the bag-shaped tank 40. Hence, consideration is made not to cause the contact.

The position of the press surface 61*a* in the X direction also has another feature. The tank 40 is provided with the gusset portions 42 on the side surfaces, as described above. The gusset portions 42 include welded portions between the flexible members and have rigidity higher than the other portions. To press and to deform the tank 40, the gusset portions 42 need to be folded inward, and a pressing force therefor is necessary. Also, in a state in which the remaining ink amount in the tank 40 is great, the gusset portions 42 are expanded in the vertical direction, and the gusset portions 42 may be expanded, not inward, but outward. In this state, a large pressing force is needed to crush the gusset portions 42. For these reasons, to efficiently press and deform the tank 40 for stirring, the press surface 61*a* is preferably arranged inside the gusset portions 42 in the X direction.

In the gusset portions 42 according to this embodiment, the width in the X direction is about 20 mm on one side in a state in which both side surfaces are folded. The press surface 61*a* is located inside the gusset portions 42 on both side surfaces, and, therefore, hardly receives the reaction force of the gusset portions 42, and can efficiently press the tank 40. According to a verification result in an actual apparatus, the pressing efficiency can further be improved by making the press surface 61*a* have such a size that fits at a distance of 10 mm or more inside the gusset portions 42 on both side surfaces. This is because, even if the press surface 61*a* is located inside the tank 40 with respect to the gusset portions 42, the reaction force of the gusset portions 42 is received to some extent in regions close to the gusset portions 42, but the influence of the reaction force of the gusset portions 42 is smaller further inside.

Figure 9A:
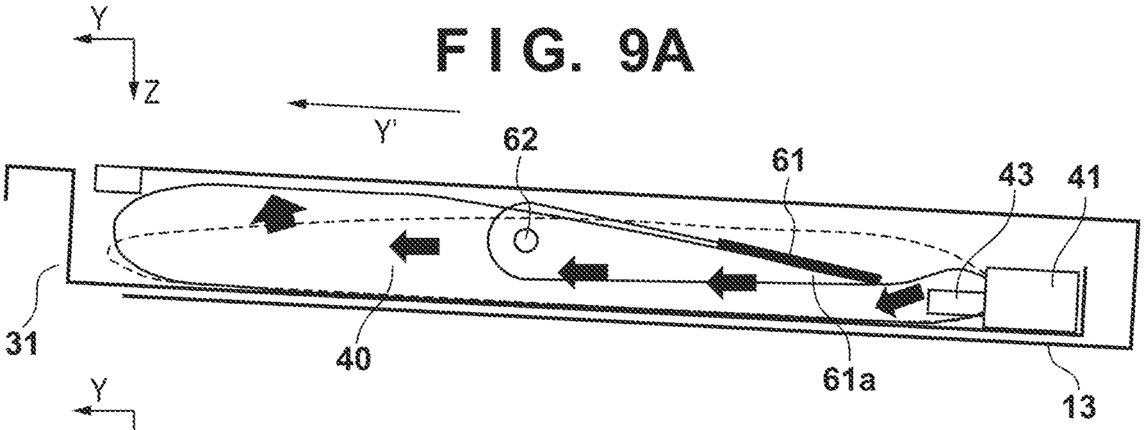
FIGS. 9A and 9B are schematic sectional views of the ink tank and a press unit.
Figure 9B:
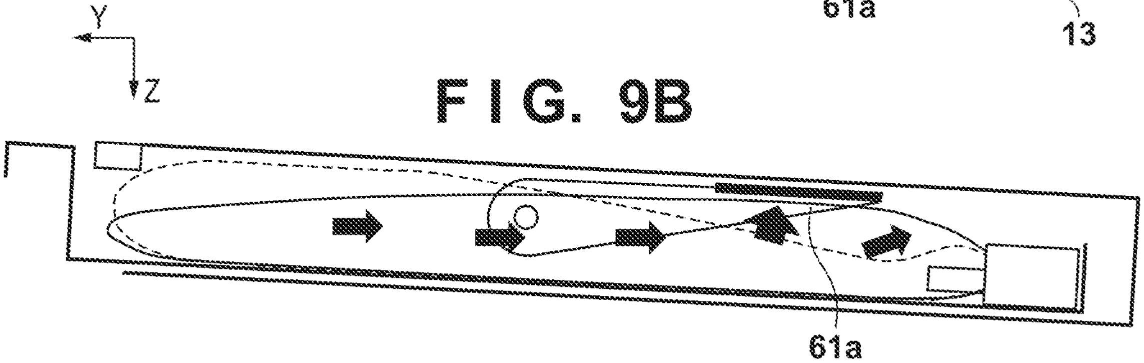

If the X-direction size of the press surface 61*a* is minimized, the press surface 61*a* may contact the tank 40 at points. However, if the side surfaces of the tank 40 correspond to the longitudinal direction when viewed from the supply port 41, like the tank 40 according to this embodiment, it is preferable to make more ink flow in the longitudinal direction because the entire tank 40 is stirred. Here, as shown in FIGS. 9A and 9B, a direction parallel to the tilt angle direction of the tank 40 is defined as a Y' direction, and in the tank 40, the side of the supply port 41 is defined as a −Y' direction, and the opposite side is defined as a +Y' direction.

If the X-direction size of the press surface 61*a* is small, ink movement caused by pressing the tank 40 and pushing it in is dispersed outward in the X direction as well, and the ink moving amount in the Y' direction accordingly decreases. According to a result of experiments, more preferably, if the size of the press surface 61*a* is ⅓ or more of the X-direction size of the tank 40, the ink moving amount at the time of press is larger in the Y' direction than in the X direction. Since the tank 40 according to this embodiment has a size of 180 mm in the X direction, the width of the press surface 61*a* is preferably 60 mm or more.

The following is a summary of the above. In a tank having a width of 180 mm and including the 20-mm gusset portions 42 formed at the two ends, the X-direction size of the press surface 61*a* is preferably set to 60 mm to 120 mm. In this embodiment, the X-direction size of the press surface 61*a* is set to 90 mm.

The position of the press plate in the Y' direction of the tank 40 will be described next with reference to FIGS. 9A and 9B. Deformation of the tank 40 and the flow of internal ink when the tank 40 is pressed will also be described.

FIGS. 9A and 9B are schematic sectional views of the tank 40 and a press unit. FIG. 9A shows a press state, and FIG. 9B shows a press cancel state. A direction parallel to the tilt angle direction of the tank 40 is defined as a Y' direction, and, in the tank 40, the side of the supply port 41 is defined as a −Y' direction, and the opposite side is defined as a +Y' direction. Note that arrows in FIGS. 9A and 9B indicate the directions of ink movement caused in the tank 40 by pressing the tank 40 or canceling the pressing.

First, the position of the press surface 61*a* in the Y' direction will be described. As described above, in a state in which the tank 40 is set in the tray holding unit 13, the tank 40 tilts with the supply port 41 facing downward in the Z direction. In this state, ink in the tank 40 moves by the dead weight to the side of the supply port 41, and the side of the supply port 41 expands as compared to the center portion of the tank 40 in the Y' direction. If the expanded portion is pressed, the ink readily moves at the time of press. Hence, the press surface 61*a* is arranged at this position. The pivot shaft 62 of the press plate 61 is provided on the opposite side of the supply port 41 in the Y' direction of the tank 40 when viewed from the press surface 61*a*. If the press plate 61 pivots about the pivot shaft 62, the pivot direction is the clockwise direction when FIGS. 9A and 9B are viewed from the front side. This causes a flow in the +Y' direction of the tank 40 in which the ink should be moved more, and the ink readily moves in the +Y' direction. Also, the position of the press surface 61*a* is preferably near the intake 43 of the tank 40. When sucking the ink from the tank 40 to the channel 57, the ink is sucked from a region close to the intake 43. Hence, if the ink is stirred by pressing a portion near the intake 43, the ink immediately before the suction is stirred well, and the ink whose concentration is even can be fed into the channel 57.

Deformation of the tank 40 and the flow of internal ink when the tank 40 is pressed will be described next. If the press plate 61 is in the press state, as shown in FIG. 9A, a portion of the tank 40 near the press surface 61*a* is recessed, the ink moves in the +Y' direction, and a side of the tank 40 opposite to the supply port 41 is expanded. After that, if the press is canceled as shown in FIG. 9B, the ink that has moved by the press moves by the dead weight in the −Y' direction. By repeating the press and the press cancellation, the ink reciprocally moves in the tank 40 many times, and the ink is stirred. When the tank transitions from the press state to the press cancel state, movement of the ink relies on the dead weight. If the dead weight of the ink is used for ink movement in one direction, stirring can be implemented by a simple configuration with a reduced number of ink movement mechanisms.

What is important when using the dead weight for ink movement is a press cycle. If press is canceled, the ink moves with a little delay from the movement of the press plate 61. If ink movement at the time of press cancellation is sufficient, a higher stirring effect can be obtained. If press is performed again after sufficient ink movement, the portion of the tank 40 expanded by the ink is pressed by the press surface 61*a*. For this reason, the ink moving amount at the time of press increases, and stirring performance becomes high. According to a verification result in an actual apparatus, the press cycle is preferably longer than 1 Hz in consideration of the speed of ink movement. Also, the longer the stirring cycle is, the longer the total time of the stirring operations is. Hence, power consumption increases. For this reason, the press cycle in this embodiment is set to about 0.6 Hz.

There can be considered a plurality of methods for sufficiently performing ink movement at the time of press cancellation. As the first method, a stay angle that is a range in which the cam follower 70 in contact with the inner cam surface 72 or the outer cam surface 73 is not displaced even if the cam 23 rotates is used. In this embodiment, the stay angle when the cam follower 70 is located at the highest point is set to 40°, and the stay angle at the lowest point is also set to 40°. In particular, the press cancel state is maintained by ensuring a stay angle of 40° at the lowest point. In addition, an allocation angle that is an angle range for raising or lowering the cam follower 70 is set as large as 140°. This is to reduce the load at the time of rotation of the cam 23 and, by slowly transitioning the connected press plate 61 from the press state to the press cancel state, ensure the time for the ink to move to a point near the press surface 61*a* during the transition. By these, ink movement at the time of press cancellation is sufficient, and the stirring effect increases.

As another method, the press unit elevating motor 25 is temporarily stopped in the press cancel state. If the motor is stopped during the time corresponding to the stay angle of 40°, the stay angle can be reduced. Hence, the allocation angle can be greater, and the load at the time of cam rotation can further be reduced.

As the timing of executing stirring, stirring may be performed any time, for example, during an ink supply operation, during a recovery operation of the printhead 7, or during standby, and the timing is not affected by the operation of the liquid supply apparatus 10 or the printing apparatus 1. Hence, in this embodiment, one session of several tens of minutes is defined, and stirring of one session is performed a day. The necessary stirring time and timing depend on the precipitation speed of ink. Hence, the setting is preferably done in accordance with the precipitation speed used in the product.

If the remaining ink amount decreases, and the tank 40 shrinks, on the upper side (+Y' side) of the tilting tank 40, the ink flows by the dead weight to the −Y' side and thus runs out, and a state in which the upper and lower portions of the tank 40 contact is obtained. Conversely, on the lower side (−Y' side), the ink is collected. Since the ink amount in the tank 40 is small in this state, the ink does not move up to the end portion of the tank 40 on the +Y' side at the time of press. Since the moving distance of ink at the time of press is short, the ink returns to the −Y' side quickly by press cancellation. For this reason, in a state in which the remaining amounts in the plurality of tanks 40 are small, the press cycle may be shortened. This can shorten the time needed for stirring.

Note that, as described above, the tilt angle with respect to the horizontal surface in a state in which the tank 40 and the tray 31 are set in the tray holding unit 13 is preferably less than 45° according to a result of experiments, and it is more effective that the angle is 10° or less. In this embodiment, the tilt angle is set to 3° in consideration of a size reduction in the Z direction. Even if the angle is close to 90°, stirring by press is possible. However, since the dead weight of ink is readily applied in the direction of resistance to ink movement by the press, a strong pressing force is necessary to sufficiently cause the ink to flow. If the angle is less than 45°, the vector of ink moving in the −Y' direction by its dead weight becomes small. Also, if the expansion amount of the tank 40 on the −Y' side at the time of press is compared while changing the angle, the expansion amount is relatively large even at 10° or less. If the expansion amount of the tank 40 on the −Y' side is great, movement of ink inside is great at the time of press. That is, the press efficiency is high.

A more detailed press position and the configuration near the press unit will be described next with reference to FIGS. 10 to 12.

Figure 10:
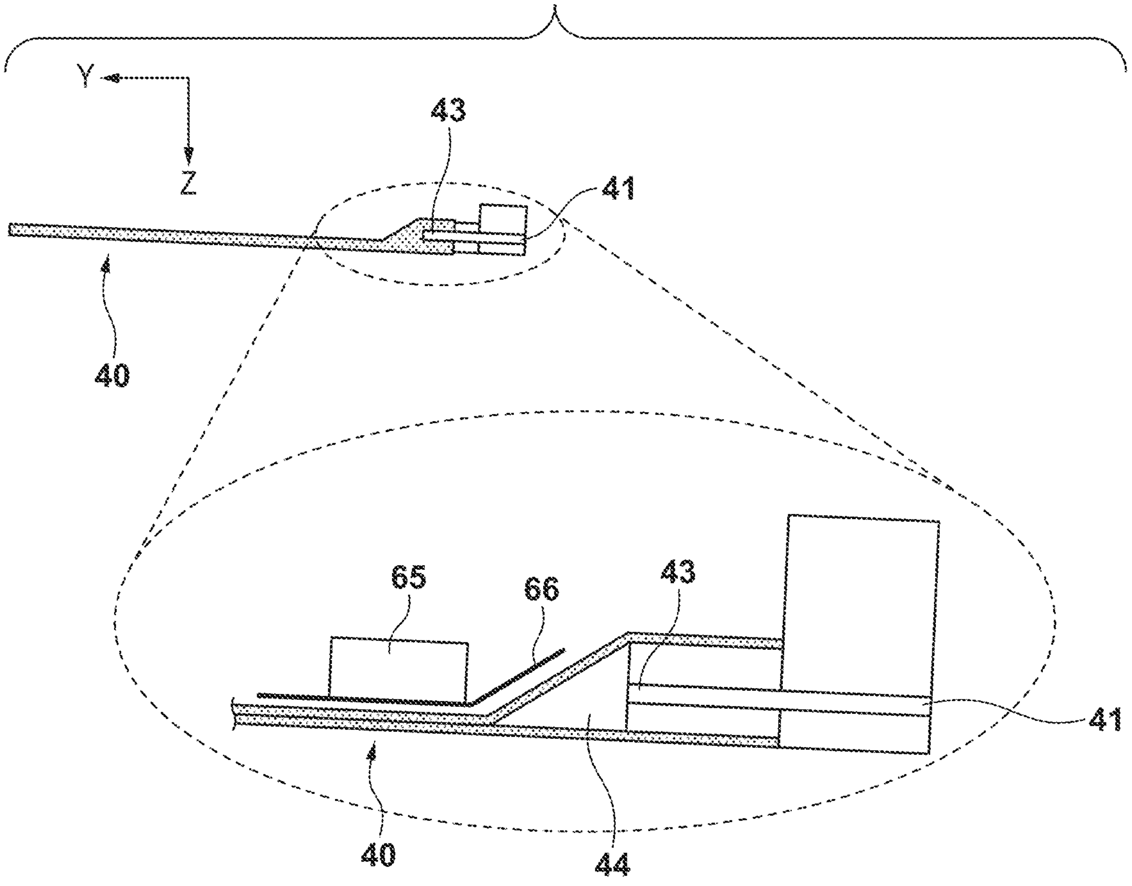
FIG. 10 is a view showing the relationship between a remaining ink amount and a tank shape.

FIG. 10 is a view showing the relationship between a remaining ink amount and a tank shape. FIGS. 11A to 11C are views showing a detailed shape of a portion near the press unit. FIG. 12 is a perspective view of the portion near the press unit.

If the remaining ink amount decreases, the tank 40 shrinks, and its thickness decreases. If the remaining ink amount is 100 ml or less, the upper and lower surfaces are nearly in contact in many regions of the tank 40. In a state in which the tank tilts, ink is collected near the press surface of the press plate 61. Only with the pivot-type press plate 61, it comes into line contact with the collapsed tank 40 at the time of press, and this is insufficient for moving the ink. Hence, in this embodiment, a base plate 64 is fixed near the distal end of the press plate 61, and a press pivot member 65 capable of pivoting about a pivot shaft 65*a* is attached to the base plate 64.

A flexible film 66 whose area is greater than that of the press pivot member 65 is pasted to the press pivot member 65. At the time of press, the flexible film 66 contacts the tank 40. The position of the pivot shaft 65*a* in the Y direction is adjusted such that in the press cancel state, the press pivot member 65 pivots clockwise by the dead weight in FIGS. 11A to 11C. In the press cancel state, the press pivot member 65 contacts the base plate 64 via a rotation regulating portion 67, and the position of the press pivot member 65 is thus regulated. If the tank 40 is pressed, the press pivot member 65 pivots about the pivot shaft 65*a* counterclockwise in FIGS. 11A to 11C, and conforming to the shape of the tank 40, the flexible film 66 comes into surface contact with the tank 40, as shown in FIGS. 11A to 11C and 12. The flexible film 66 comes into surface contact with the tank 40 and can therefore press a wide range. Hence, ink can be moved even in a state in which the remaining ink amount is small, and the tank 40 shrinks.

The flexible film 66 has an effect of, for the collapsed tank 40, expanding the area to push in. When pressing the tank 40 that is expanded because of a large remaining ink amount, the press pivot member 65 deeply bites into the tank 40, and a portion of the flexible film 66 projecting from the press pivot member 65 receives the reaction force of the tank 40 and deflects upward. Hence, the press load focuses on the area of the press pivot member 65, and it, is therefore, possible to deeply push the tank 40 in and move more ink. With this configuration, optimum ink movement according to the remaining amount can be performed, and stirring performance improves.

Furthermore, as shown in FIG. 10, in the tank 40 with a small remaining amount, the upper and lower surface of the tank 40 are nearly in contact. The intake 43 has a predetermined thickness in the thickness direction of the tank 40. For this reason, an ink pool 44 having a triangular shape in a cross section is formed, and it is preferable to press this portion to move the ink in the ink pool 44. The press plate 61 is arranged at a position where the flexible film 66 can press the ink pool 44. Also, since the ink pool 44 cannot completely be crushed, it is preferable that the press pivot member 65 is arranged at a position not overlapping the ink pool 44 in the Y' direction, and the press plate 61 is arranged such that only the flexible film 66 presses the ink pool 44. Thus, in a state in which the remaining amount in the tank 40 is small, the press load can widely be applied to a collapsed portion of the tank 40 except the ink pool 44 by the press pivot member 65 and the flexible film 66. In addition, the press load can be applied to the ink pool 44 as well using deformation of a part of the flexible film 66, and stirring performance improves. For the flexible film 66, a material with a high sliding property such as PET is used, thereby preventing generating of flaws at the time of contact with the tank 40. Also, if the remaining ink amount in the tank 40 is large, as described above, the flexible film 66 deflects upward by the reaction force of the tank 40. However, if the flexible film 66 exists, the pressed tank 40 is not recessed locally but deformed moderately in a relatively wide range. For this reason, the tank 40 can be prevented from breaking due to fatigues in repetitive press of the tank 40.

Figure 13A:
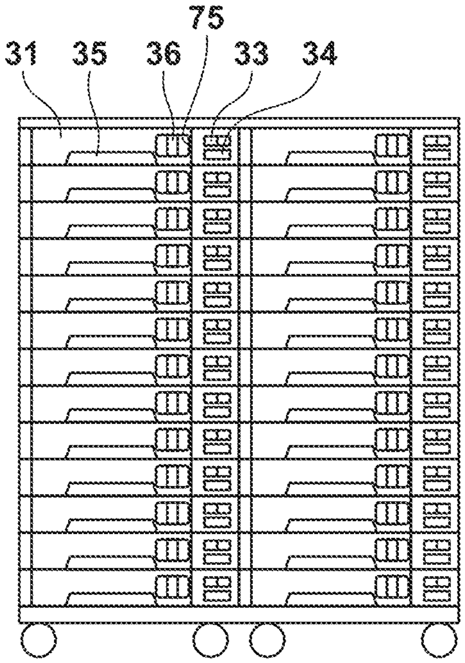
FIGS. 13A and 13B are front views of the liquid supply apparatus.
Figure 13B:
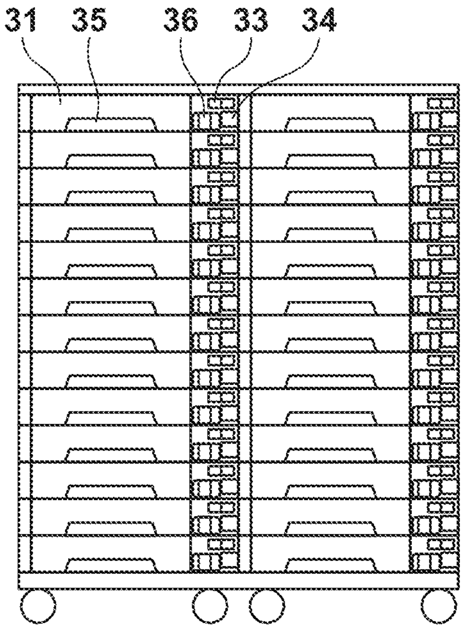

FIGS. 13A and 13B are front views of the liquid supply apparatus 10, and the X-direction arrangement of components to be mainly operated by the user will be described with reference to these views.

As shown in FIG. 13A, a tank state notification unit 33 and a color label 34 are arranged on the +X side of the liquid supply apparatus 10. The tank state notification unit 33 is formed by two color LEDs and provided in each stage. The two color LEDs are each configured to switch light-on, blinking, and light-off. By combining these lighting states, the user can be notified of the state of the tank 40 of each stage. More specifically, the remaining ink amount is estimated from the assumed discharge amount in the printhead 7, and if the remaining ink amount is small, one LED blinks. This can show the ink exchange time to the user and promote him/her to prepare a new ink tank. Also, with the color label, the user can be notified which color tank 40 should be set in which stage. The tank state notification unit 33 and the color label 34 are arranged vertically and made to overlap in the X direction, thereby reducing the width in the X direction. As described above, the stirring drive unit 20 is arranged on the side surface on the same +X side. When the components that need widths are concentrated to the +X side and made to overlap in the X direction, the width on the −X side can be reduced. This can implement size reduction of the apparatus.

Also, the above-described lock operation unit 36 is arranged on the +X side of the tray 31. The lock detection sensor 75 that detects the operation state of the lock operation unit 36 is arranged on the back surface portion of the tank state notification unit 33 and the color label 34. When the mechanism portions concerning tray lock, which need a space to arrange, are arranged on the side of the tray 31, and only the lock detection sensor 75 having a relatively small size is arranged on the +X side outside the tray 31, the apparatus can be made small. In addition, when parts associated with user operations and visual recognition portions are concentrated to the +X side, usability can be improved.

Also, as the X-direction arrangement of the components to be mainly operated by the user, a configuration as shown in FIG. 13B can also be considered. The difference from FIG. 13A is the position of the lock operation unit 36, which is arranged, not in the tray 31, but in the housing of the liquid supply apparatus 10. That is, in a state in which the tray 31 is removed, the lock operation unit 36 remains on the side of the liquid supply apparatus 10. This can simplify the configuration of the tray 31.

Figure 14:
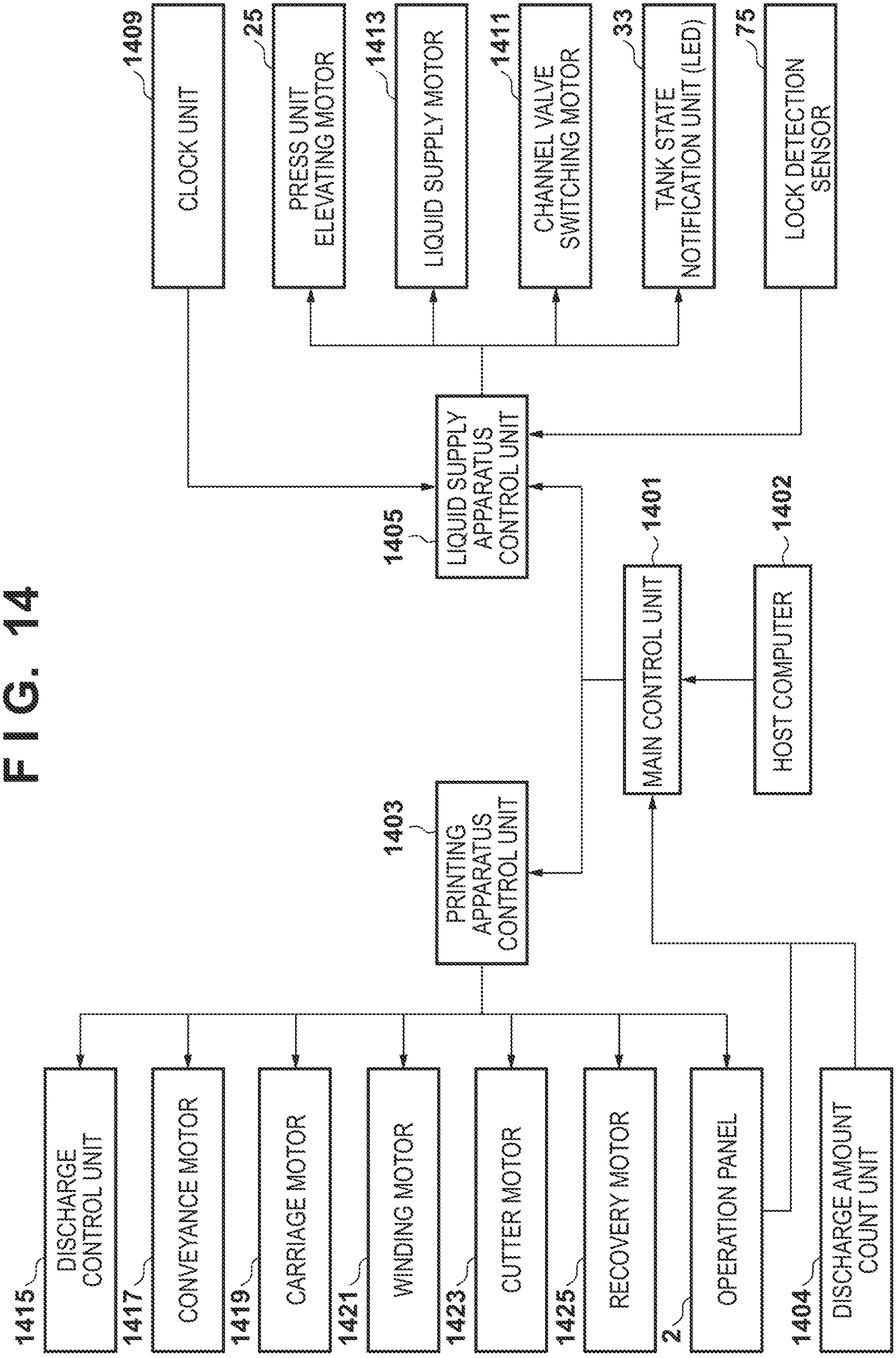
FIG. 14 is a schematic block diagram of the printing apparatus and the liquid supply apparatus.

The control configuration of the printing apparatus and the liquid supply apparatus and control of the stirring operation will be described here with reference to FIGS. 14, 15A, and 15B. FIG. 14 is a schematic block diagram of the printing apparatus and the liquid supply apparatus, and FIGS. 15A and 15B are flowcharts showing the stirring operation.

As shown in FIG. 14, a main control unit 1401 arranged in the printing apparatus 1 receives an input from a host computer 1402 or the operation panel 2 and information from a discharge amount count unit 1404, and sends an instruction to a printing apparatus control unit 1403 or a liquid supply apparatus control unit 1405. The printing apparatus control unit 1403 or the liquid supply apparatus control unit 1405 controls the operations of actuators such as motors. Control signals are sent not only to the motors but also to the tank state notification unit 33 to perform control of lighting or blinking the LEDs. Also, a clock unit 1409 counts time elapsed from transmission of the control signals to the actuators and sends the information to the liquid supply apparatus control unit 1405. Control of the stirring time or timing is done by transmitting a control signal to the press unit elevating motor 25 based on the time count by the clock unit 1409. Note that the liquid supply apparatus control unit 1405 also controls a liquid supply motor 1413. Furthermore, the printing apparatus control unit 1403 controls a discharge control unit 1415, a conveyance motor 1417, a carriage motor 1419, a winding motor 1421, a cutter motor 1423, a recovery motor 1425, and the like in the printing apparatus 1.

Figure 15A:
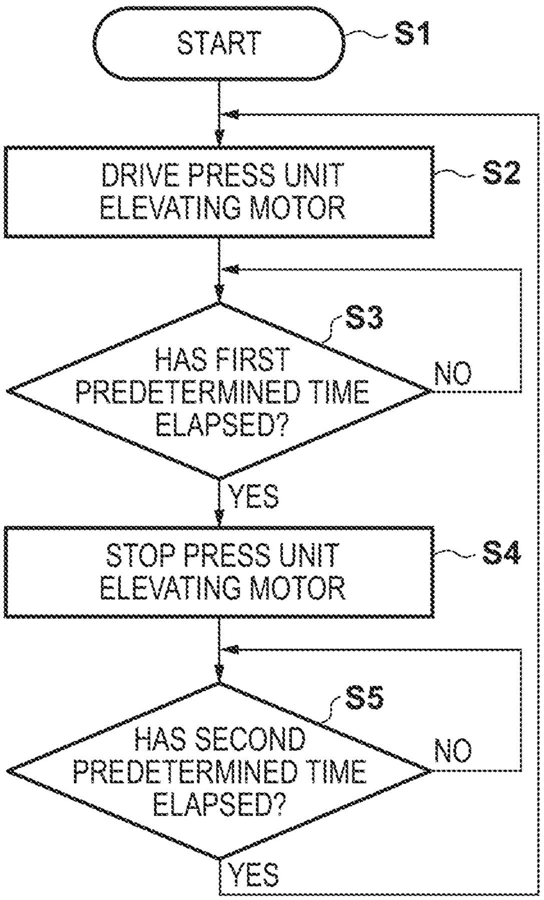
FIGS. 15A and 15B are flowcharts showing a stirring operation.
Figure 15B:
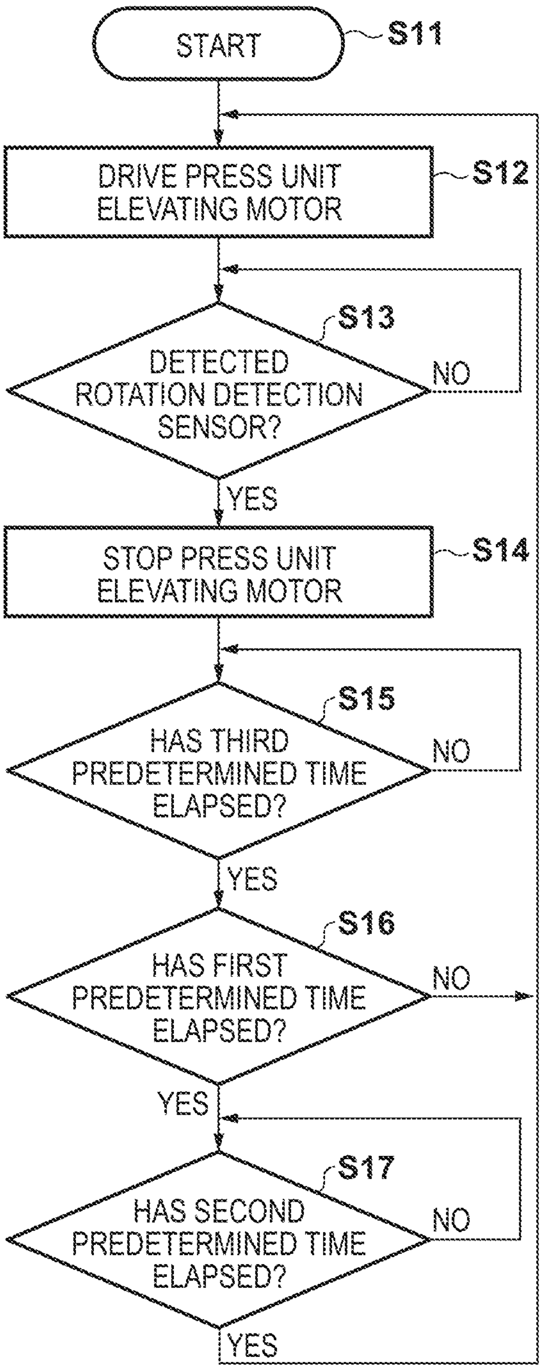

FIG. 15A is a flowchart showing the stirring operation according to this embodiment.

If the liquid supply apparatus 10 is powered on, the liquid supply apparatus control unit 1405 starts the sequence of the stirring operation in step S1.

In step S2, the liquid supply apparatus control unit 1405 drives the press unit elevating motor 25 to start the stirring operation of the tank 40.

In step S3, the liquid supply apparatus control unit 1405 determines whether a first predetermined time has elapsed. If the first predetermined time has elapsed, the process advances to step S4. If the first predetermined time has not elapsed, the process of step S3 is repeated. As described above, in the stirring operation, stirring for several tens of minutes (first predetermined time) is defined as one session. In step S3, the motor is continuously driven to continue stirring in the tank 40 until this time elapses.

In step S4, the liquid supply apparatus control unit 1405 stops the press unit elevating motor 25.

In step S5, the liquid supply apparatus control unit 1405 determines whether a second predetermined time has elapsed. If the second predetermined time has elapsed, the process returns to step S2. If the second predetermined time has not elapsed, the process of step S5 is repeated. Here, since stirring of one session is performed a day, the stop state of the press unit elevating motor 25 is continued until one day (second predetermined time) elapses. When one day elapses, the process returns to step S2 to drive the press unit elevating motor 25 again.

The above-described operation is continued until a stop instruction, for example, to power off is transmitted.

A flowchart of another example of the stirring operation will also be described here. FIG. 15B is a flowchart showing a method of temporarily stopping the press unit elevating motor 25 in the above-described press cancel state.

If the liquid supply apparatus 10 is powered on, the liquid supply apparatus control unit 1405 starts the sequence of the stirring operation in step S11.

In step S12, the liquid supply apparatus control unit 1405 drives the press unit elevating motor 25 to start the stirring operation of the tank 40. Here, after the liquid supply apparatus control unit 1405 drives the press unit elevating motor 25, rotation of the cam 23 is detected by the above-described rotation detection sensor 30. The rotation detection sensor 30 uses a photointerrupter, as described above, and is arranged such that the flag provided on the cam 23 shields the rotation detection sensor once per rotation. Also, the rotation detection sensor 30 is arranged such that the press plate 61 is set in the press cancel state when the rotation detection sensor is shielded.

In step S13, the liquid supply apparatus control unit 1405 determines whether shield of the rotation detection sensor 30 is detected. If shield of the rotation detection sensor 30 is detected, the process advances to step S14. If shield is not detected, the process of step S13 is repeated.

In step S14, the liquid supply apparatus control unit 1405 stops the press unit elevating motor 25.

In step S15, the liquid supply apparatus control unit 1405 determines whether a third predetermined time has elapsed. If the third predetermined time has elapsed, the process advances to step S16. If the third predetermined time has not elapsed, the process of step S15 is repeated.

This is to wait for the ink to move to a point near the press unit in the press cancel state, as described above. The press unit elevating motor 25 is stopped for about 0.5 to 1 sec (third predetermined time) to keep a press cycle of 0.6 Hz (stop for the third predetermined time), depending on the profile setting of the cam.

In step S16, the liquid supply apparatus control unit 1405 determines whether a first predetermined time has elapsed. If the first predetermined time has elapsed, the process advances to step S17. If the first predetermined time has not elapsed, the process advances to step S12. As described above, in the stirring operation, stirring for several tens of minutes (first predetermined time) is defined as one session. If this time has not elapsed in step S16, the process advances to step S12 to start driving the press unit elevating motor 25 again. By the processes of steps S12 to S16, the press unit elevating motor 25 is continuously driven until the first predetermined time elapses while inserting the stop for the third predetermined time.

In step S17, the liquid supply apparatus control unit 1405 determines whether a second predetermined time has elapsed. If the second predetermined time has elapsed, the process returns to step S12. If the second predetermined time has not elapsed, the process of step S17 is repeated. Here, since stirring of one session is performed a day, the stop state of the press unit elevating motor 25 is continued until one day (second predetermined time) elapses. When one day elapses, the process returns to step S12 to drive the press unit elevating motor 25 again.

The above-described operation is continued until a stop instruction, for example, to power off is transmitted.

Note that, in this embodiment, a method of executing the stirring operation at a predetermined timing for a predetermined time has been described. At the time of initial installation or tank exchange, the stirring time is prolonged, or the stirring timing is set not every other day but every several hrs. At the time of initial installation or tank exchange, in many cases, the tank 40 has been left to stand for a long time, and precipitation has progressed in ink. Hence, the stirring time is preferably prolonged to sufficiently perform stirring.

In this embodiment, a method of managing the stirring time of one session by time count of the clock unit 1409 has been described. However, the stirring time may be managed by pulse count using a pulse motor or an encoder sensor or based on the number of times of press determined by the number of times of detection of the above-described rotation detection sensor.

Also, in a state in which stirring is not performed, the press plate 61 is preferably in the press cancel state. This is to prevent an extra load from being applied to the tank 40. Also, if the user operates the lock operation unit 36 to obtain the lock cancel state during the stirring operation, the press plate 61 is quickly shifted to the stirring cancel state to stop the stirring operation. Accordingly, when the user draws out the tray for tank exchange or the like, the tray 31 can smoothly be drawn out without an extra load on the tank 40 and the tray 31.

In this embodiment, a configuration in which the bag-shaped tank 40 is pressed by a press mechanism has been described. However, the present invention is not limited to this configuration, and the tank 40 may be deformed by repeating compressed air blowing and stop. Alternatively, a configuration in which the tank 40 is deformed by pressuring and depressurizing a space around the tank 40 may be employed.

The mechanism of the press unit will be described here in more detail. According to FIG. 7, the press plate 61 includes the pivot shaft 62 formed by a pivot center 410*a* on the near side and a pivot center 410*b* on the far side, and is pivotally supported. In addition, the press surface 61*a* is formed at the distal end of the press plate 61, and the press state is set by pivotal movement in the clockwise direction (CW direction) about the pivot shaft 62, and the press cancel state is set by pivotal movement in the counterclockwise direction (CCW direction). The action of a single spring will be described first, and an action in a case when two springs, that is, the first press spring and the second press spring are used will be described next.

Figure 16A:
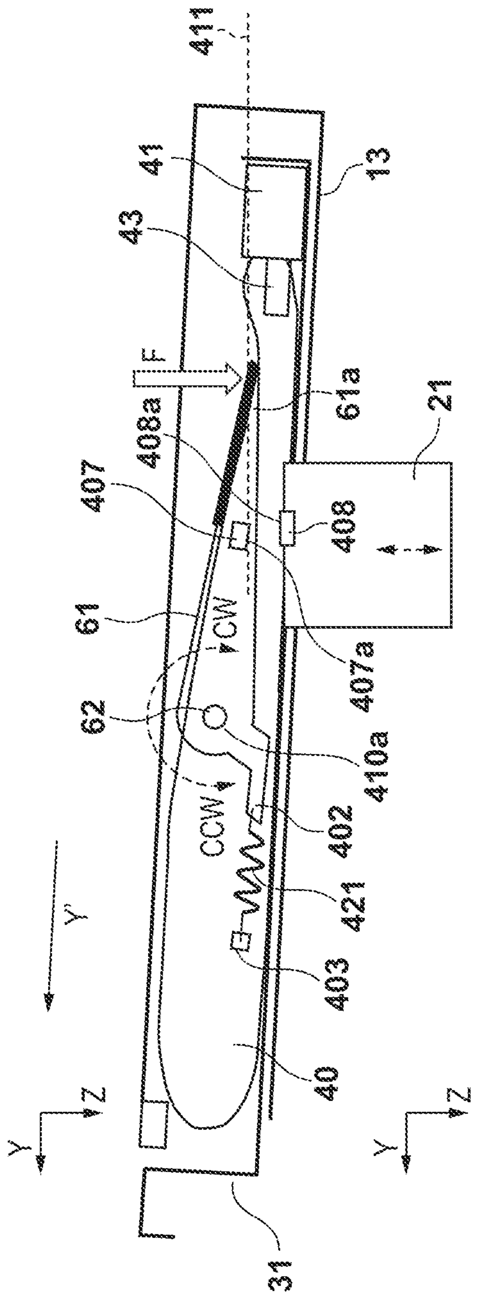
FIGS. 16A to 16C are explanatory views of a press mechanism using a single spring.

The action of a single spring will be described with reference to FIGS. 16A to 16C. First, in FIG. 16A, a first engaging portion 402 is formed at the rear end of the press plate 61 on the side of the pivot center 410*a* (on the near side in FIG. 16A), and a press spring 421 is suspended between the first engaging portion 402 and a tray engaging portion 403 provided on the tray holding unit 13.

Note that, in this embodiment, as the press plate 61, a sheet metal material such as a zinc-coated steel sheet having a high rigidity is employed to prevent twist from occurring in the press state. However, a resin material with a shape ensuring rigidity may be used. Also, a spring engaging portion is provided on the tray holding unit 13, but a fixed portion in the apparatus main body may be used.

As described above, since the press plate 61 pivots clockwise by the tensile force of the press spring 421, the tank 40 is set to the press state.

Figure 16B:
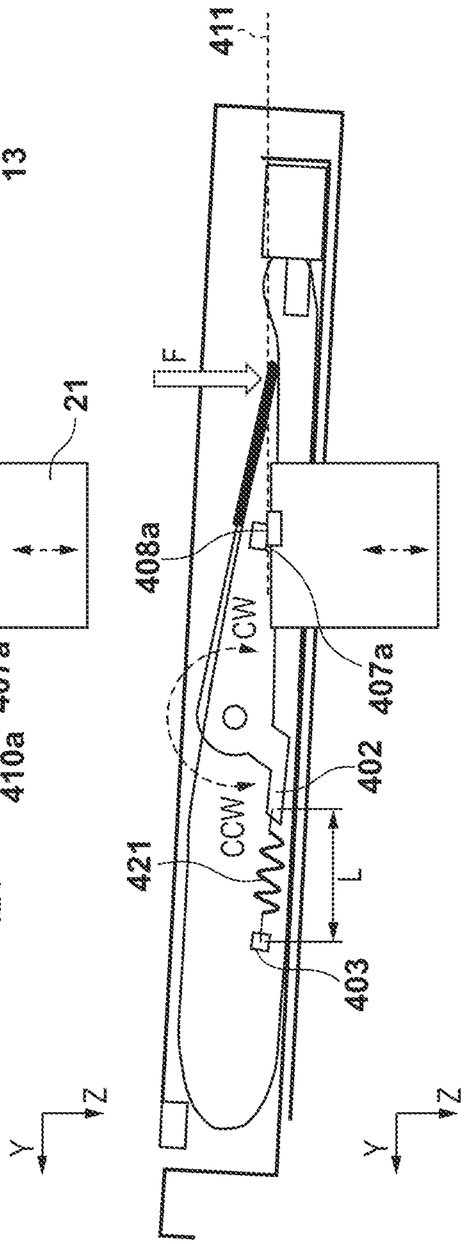

As shown in FIG. 16B, the press plate abutting portion 407 is provided on the side of the pivot center 410*a* of the press plate 61 (on the near side in FIG. 16B), and the elevating plate abutting portion 408 is provided on the elevating plate 21. Here, when the elevating plate 21 moves upward, the press plate abutting portion 407 and the elevating plate abutting portion 408 abut against each other at abutting portions 407*a* and 408*a*. This is defined as an abutment start point height 411.

Figure 16C:
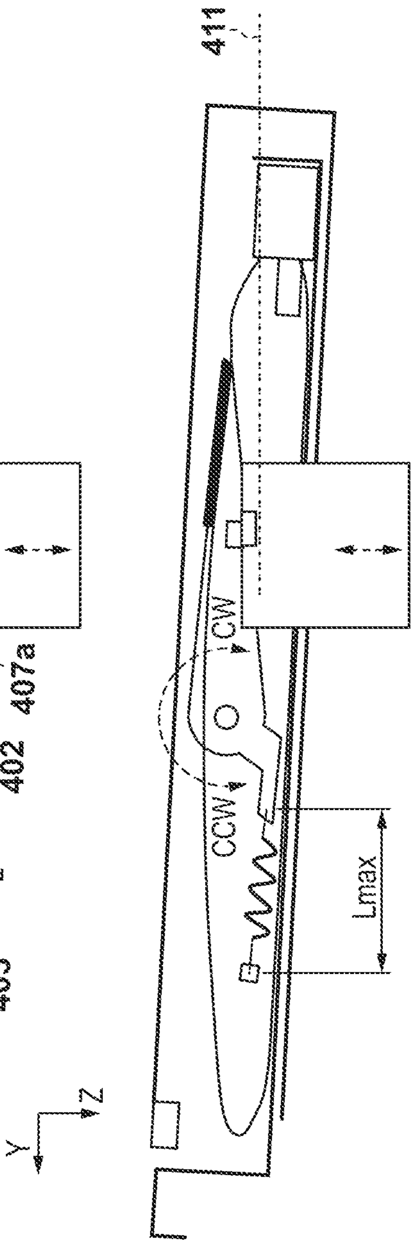

As shown in FIG. 16C, if the elevating plate 21 moves to above the abutment start point height 411, the press plate 61 pivots counterclockwise about the pivot shaft 62, and is set to the press cancel state. To the contrary, the elevating plate 21 moves downward, and the press plate 61 pivots clockwise about the pivot shaft 62 and returns to the press state when reaching the abutment start point height 411.

Note that, in this embodiment, since the press spring is suspended only on one side of the press plate, the elevating mechanism that cancels press is also arranged only on one side. However, if the rigidity of the press plate 61 is sufficiently high, the press spring may be arranged on the opposite side. If press springs are suspended on both sides, the elevating mechanism of the elevating plate 21 may be arranged on each side.

The action of the single spring will be described with reference to FIGS. 16A to 16C while focusing on the load of the motor. The shift from the state shown in FIG. 16B to the state shown in FIG. 16A indicates the press state. The elevating plate 21 lowers, and the abutting portions 407*a* and 408*a* are separated. In this case, since the elevating plate 21 does not receive the reaction force of the press spring 421, the load of the press unit elevating motor 25 by the reaction force of the spring is 0. However, since a friction loss for moving the drive transmission portion or the elevating plate 21 is generated, the motor load is defined as T0.

Next, the shift from the state shown in FIG. 16B to the state shown in FIG. 16C indicates the press cancel state. The elevating plate 21 rises, and the abutting portion 408*a* abuts against the abutting portion 407*a* to push it up. Thus, the press plate 61 pivots counterclockwise about the pivot shaft 62. Then, the elevating plate 21 receives the reaction force of the press spring 421.

Let L be the load length of the press spring 421 at the start of press cancel shown in FIG. 16B, and Lmax be the load length at the end of press cancel shown in FIG. 16C. Also, let F be the pressing force of the press plate 61 downward in the Z direction at the load length L of the press spring 421. At this time, let T be a motor load corresponding to the maximum reaction force with which the press spring 421 reaches the load length Lmax, and T0 be the friction loss generated by movement of each member as described above. Note that since the shift from the state shown in FIG. 16C to the state shown in FIG. 16B indicates a motion of the press spring 421 shrinking from Lmax to L, the elevating plate 21 is rather pushed in the moving direction and does not serve as the resistance to motor drive.

The following is a summary of these. If a pressing force necessary for the press plate 61 is F, the motor load in the press state is T0, and the motor load in the press cancel state is T+T0. T0 is a value much smaller than T described here, and can be neglected without any problem. For this reason, a description will be made below while excluding the motor load T0 of the friction loss caused by movement of each member. Hence, if a single spring is used, motor performance corresponding to the load T that is a Max load is essential. Note that FIGS. 16A to 16C show a case when the tank 40 is full, and the pressing force F in this embodiment is set to about 500 gf, as described above.

An action in a case when two springs, that is, the first press spring and the second press spring are used will be described next with reference to FIGS. 17A to 17C. First, in FIG. 17B, the first press spring 401 is suspended between the first engaging portion 402 and the tray engaging portion 403 at the rear end of the press plate 61 on the near side of the pivot shaft 62.

Also, a second engaging portion 405 is formed at the intermediate point of the press plate 61 on the near side of the pivot shaft 62, and the second press spring 404 is suspended between the second engaging portion 405 and an elevating plate engaging portion 406 provided on the elevating plate 21.

Figure 17A:
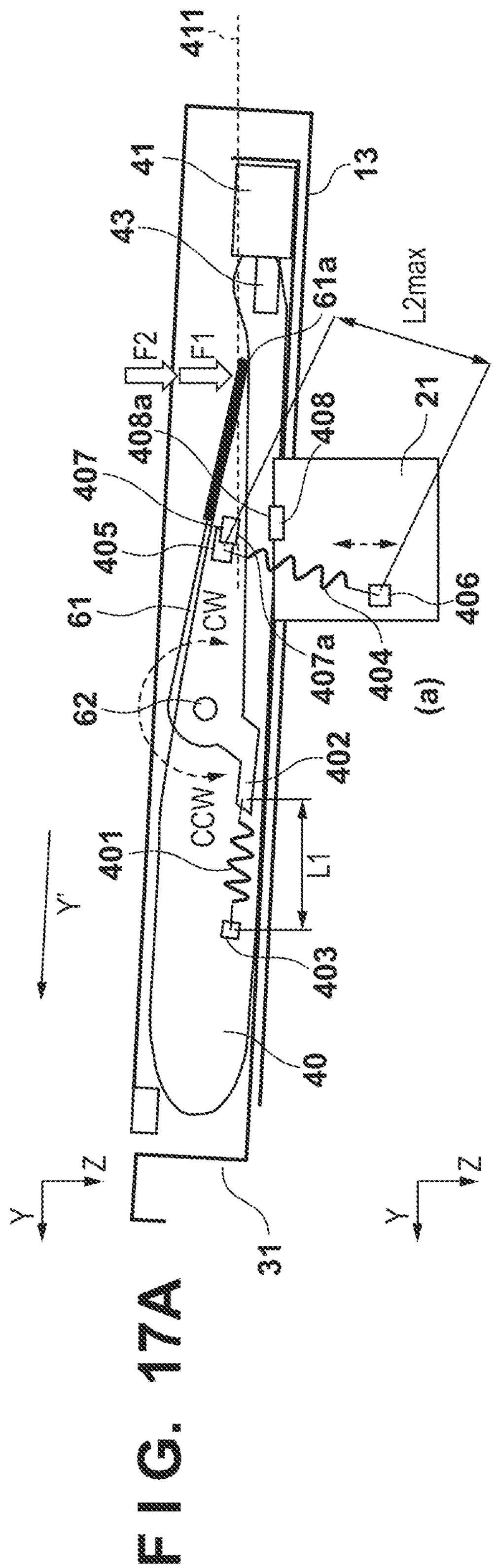
FIGS. 17A to 17C are explanatory views of a press mechanism using two springs.
Figure 17B:
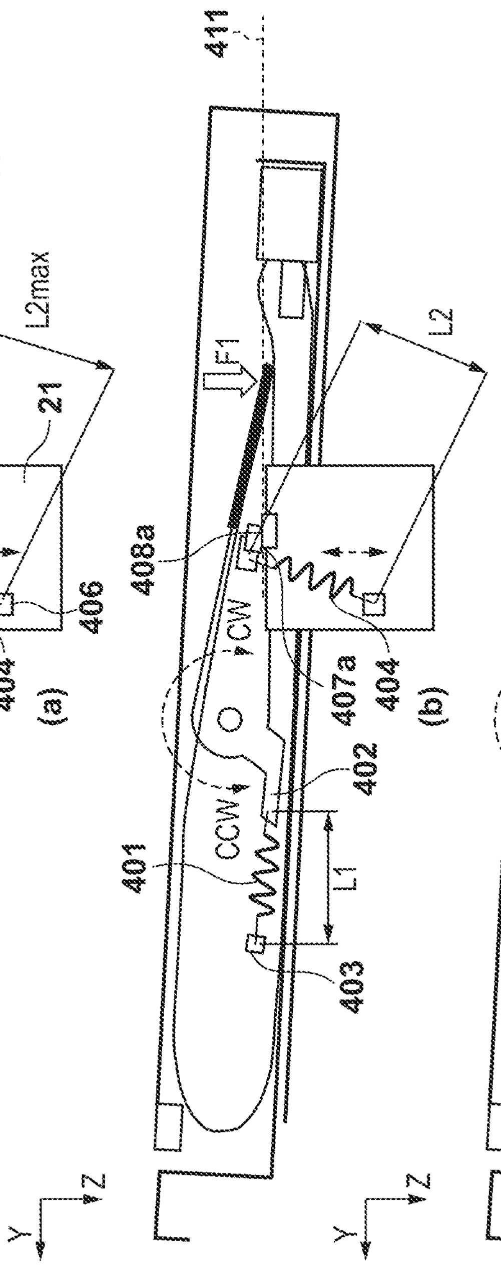

As shown in FIG. 17B, a height at which the abutting portions 407*a* and 408*a* start abutting against each other is defined as the abutment start point height 411. This state is the first press state by the first press spring 401. In a situation where the abutting portions 407*a* and 408*a* abut against each other, the second press spring 404 is only suspended in an internal structure in which the second engaging portion 405 and the elevating plate 21 are considered to be integrated. Hence, the biasing force of the second press spring 404 is the internal force of the elevating plate 21, and does not serve as a load for moving the elevating plate 21 up and down.

In FIG. 17A, if the elevating plate 21 moves below the abutment start point height 411, the abutting portions 407*a* and 408*a* are separated, and the second press spring 404 is expanded. By the reaction force of the second press spring 404, the press plate 61 generates a rotation force in the clockwise direction about the pivot shaft 62, and a second press state in which the pressing force is increased is consequently obtained.

Referring back to FIG. 17B, if the elevating plate 21 moves upward and reaches the abutment start point height 411, the second press spring 404 returns to the state in which it is only suspended, and a second press cancel state is obtained.

Figure 17C:
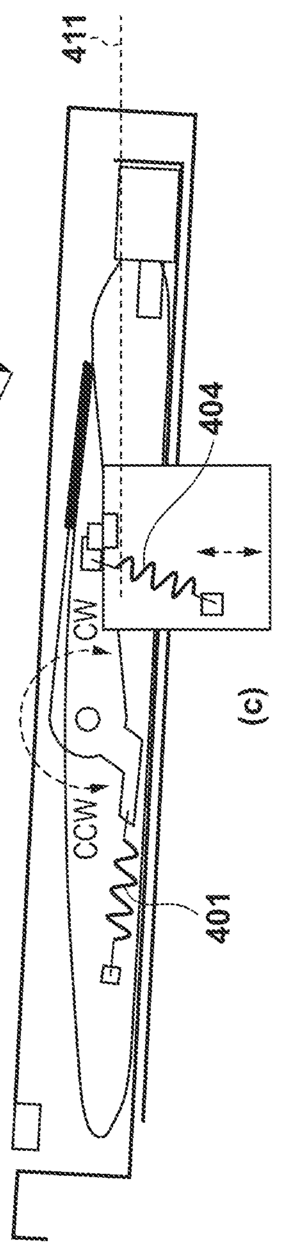

Finally, in FIG. 17C, the elevating plate 21 further moves upward, the press plate 61 pivots counterclockwise about the pivot shaft 62 and is set in a first press cancel state.

An action in a case when two springs, that is, the first press spring and the second press spring are used will be described with reference to FIGS. 17A to 17C while focusing on the load of the motor.

The shift from the state shown in FIG. 17B to the state shown in FIG. 17A indicates the press state. The elevating plate 21 lowers, and the abutting portions 407*a* and 408*a* are separated. In this case, since the elevating plate 21 does not receive the reaction force of the first press spring 401, the motor load by the reaction force of the first press spring 401 is 0. Let L1 be the load length of the first press spring 401 at this time, and F1 be a pressing force generated downward in the Z direction by the reaction force.

On the other hand, since the abutting portions 407*a* and 408*a* are separated, the elevating plate 21 lowered by the press unit elevating motor 25 receives the reaction force of the second press spring 404. Let L2 be the load length of the second press spring 404 at the press start time in FIG. 17B, and L2max be the load length at the time of maximum press in FIG. 17A. Here, if the pressing force of the second press spring 404 downward in the Z direction is F2, a motor load corresponding to the maximum reaction force with which the spring reaches the load length L2max is defined as T2. In this case, in the press state, a pressing force of (F1+F2) is generated on the tank 40 in total.

The shift from the state shown in FIG. 17B to the state shown in FIG. 17C indicates the press cancel state. The elevating plate 21 rises, and the abutting portion 408*a* abuts against the abutting portion 407*a* to push it up. Thus, the press plate 61 pivots counterclockwise about the pivot shaft 62. The elevating plate 21 pushes the press plate 61 up and therefore receives the reaction force of the first press spring 401.

If the load length of the first press spring 401 at the press cancel start time in FIG. 17B is L1, and the load length at the press cancel end time in FIG. 17C is L1max, a motor load corresponding to the maximum reaction force with which the first press spring 401 reaches the load length L1max is defined as T1.

Here, if the necessary pressing force is F, like the single spring method, F1+F2=F suffices. Hence, each of F1 and F2 need only be about ½ of F. That is, the spring loads of the first press spring 401 and the second press spring 404, which are the pressing force generation sources, are also about ½, and as a result, the motor loads T1 and T2 corresponding to the reaction force also need only be about ½. In the press state, the motor load is only T2, and in the press cancel state, the motor load is only T1. In the two states, the load becomes even and can be dispersed. That is, since the motor loads T1 and T2 are each about ½ of T, the motor performance can be reduced to about ½.

In this embodiment, the first press spring 401 and the second press spring 404 are tension springs. However, these may be formed by compression springs. The engaging portions of the first press spring 401 and the second press spring 404 may be replaced with respect to the pivot shaft 62 serving as a fulcrum. The press state is obtained by lowering the elevating plate 21, and the press cancel state is obtained by raising it. However, the abutting direction of an abutting portion 409 may be inverted such that the press state is obtained by raising, and the press cancel state is obtained by lowering.

Modification of First Embodiment

A modification of the first embodiment will be described next with reference to FIGS. 18A and 18B. A description of the same portions as in the first embodiment will be omitted, and different portions will be described.

Figure 18A:
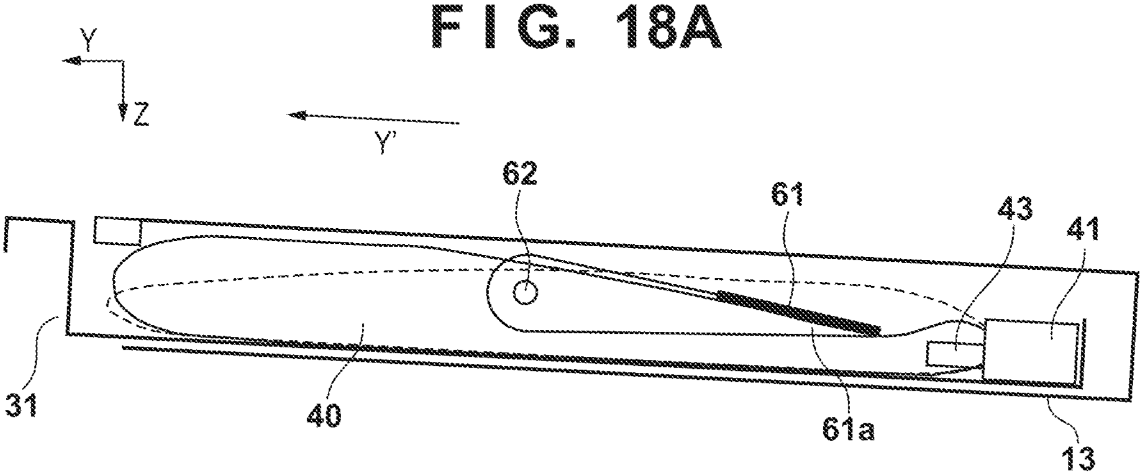
FIGS. 18A and 18B are schematic sectional views of the ink tank and the press unit.
Figure 18B:
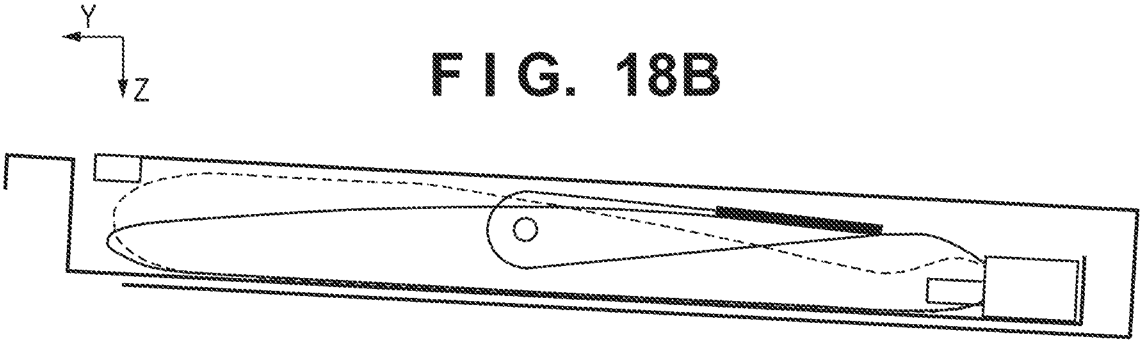

FIGS. 18A and 18B are schematic sectional views of the ink tank and the press unit. FIG. 18A shows the press state, and this is the same as in the first embodiment. FIG. 18B shows a small press state in which the press plate 61 pivots, and the push amount (press amount) to the tank 40 is decreased. At this time, the press surface 61*a* is in contact with the tank 40. If the press cancel state according to the first embodiment is replaced with the small press state, high stirring performance can be exhibited. That is, the ink in the tank 40 can be caused to flow in the Y' direction by alternately repeating the states shown in FIGS. 18A and 18B. In the small press state, the upper limit position of the press plate 61 in the Z direction can be suppressed to be low, and, if each stage has the configuration, the size of the liquid supply apparatus 10 in the height direction (Z direction) can be reduced.

Second Embodiment

The second embodiment will be described below. A description of the same portions as in the first embodiment will be omitted, and different portions will be described.

Figure 19A:
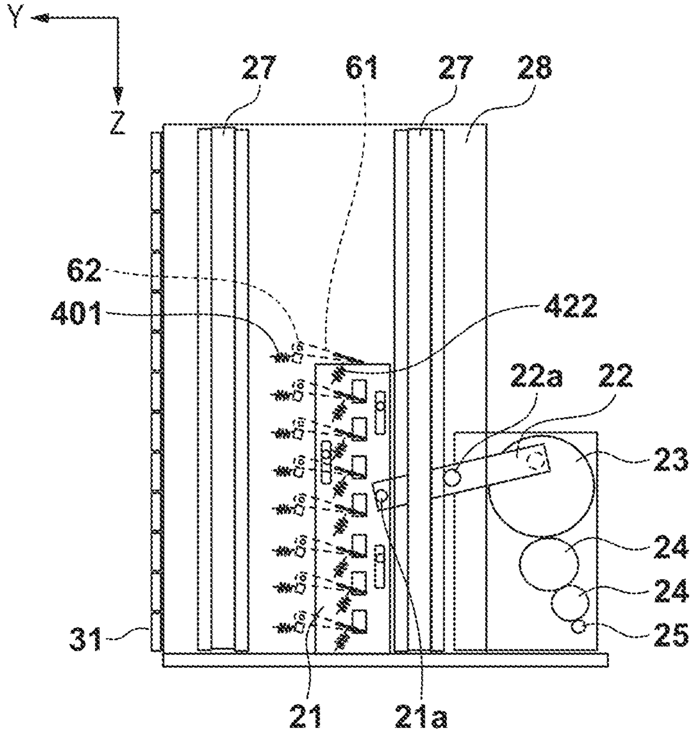
FIGS. 19A and 19B are side views of a liquid supply apparatus.
Figure 19B:
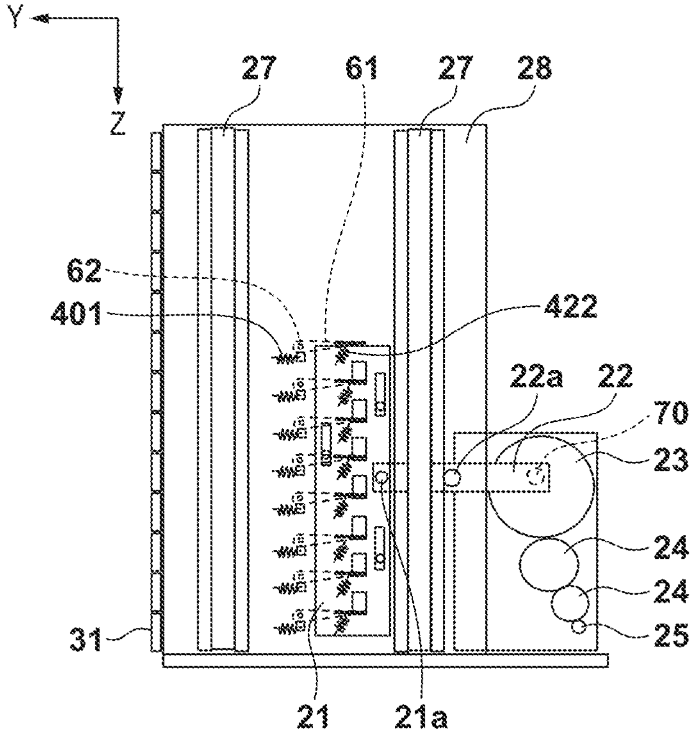

FIGS. 19A and 19B are views for explaining formation of multistage press mechanisms while focusing on the load of a motor.

First, FIG. 19A shows a press state in a case when eight stages of press mechanisms are stacked. As in the first embodiment, a first press spring 401 and a second press spring 404 are installed in each stage. The press mechanism of each stage includes abutting portions 407*a* and 408*a*, and an elevating plate engaging portion 406 is arranged on the elevating plate 21. The elevating plate 21 lowers by motor drive and, if the elevating plate engaging portion 406 pulls the second press spring 404, receives the reaction force thereof. Hence, a motor load when the elevating plate 21 lowers includes loads T2 of eight stages and is T2×8 in total.

On the other hand, FIG. 19B shows a press cancel state. The elevating plate 21 rises by motor drive. If the abutting portion 408*a* of each stage pushes a press plate 61 up, the first press spring 401 is pulled, and the elevating plate 21 receives the reaction force thereof. At this time, the biasing force of the second press spring 404 is the internal force of the elevating plate 21 and, therefore, does not serve as the motor load. Hence, the motor load includes loads T1 of eight stages and is T1×8 in total.

Although the motor load is the sum of loads as many as the stages, the loads in the press state and the press cancel state are T2 and T1, respectively, and the loads can be dispersed. This effect is the same as in a case when only one stage is used. If the configuration according to this embodiment is used, even if multistage press mechanisms are formed, the motor load can be dispersed in both the press state and the press cancel state, and it is effective in suppressing motor performance.

Third Embodiment

As for inks used in printing apparatus, the particle size of a pigment, the type and amount of an additive, and the like, may be different between colors, and depending on ink colors, there exist some inks that precipitate at a very high speed. For an ink that readily precipitates, it is effective to increase a pressing force on a tank 40. Reversely, for an ink difficult to precipitate, an even concentration can be obtained even if the pressing force is reduced. Hence, if inks arranged on the stages have different characteristics, the setting of a press spring may be changed in accordance with the ink characteristic of each stage.

Fourth Embodiment

Figure 20A:
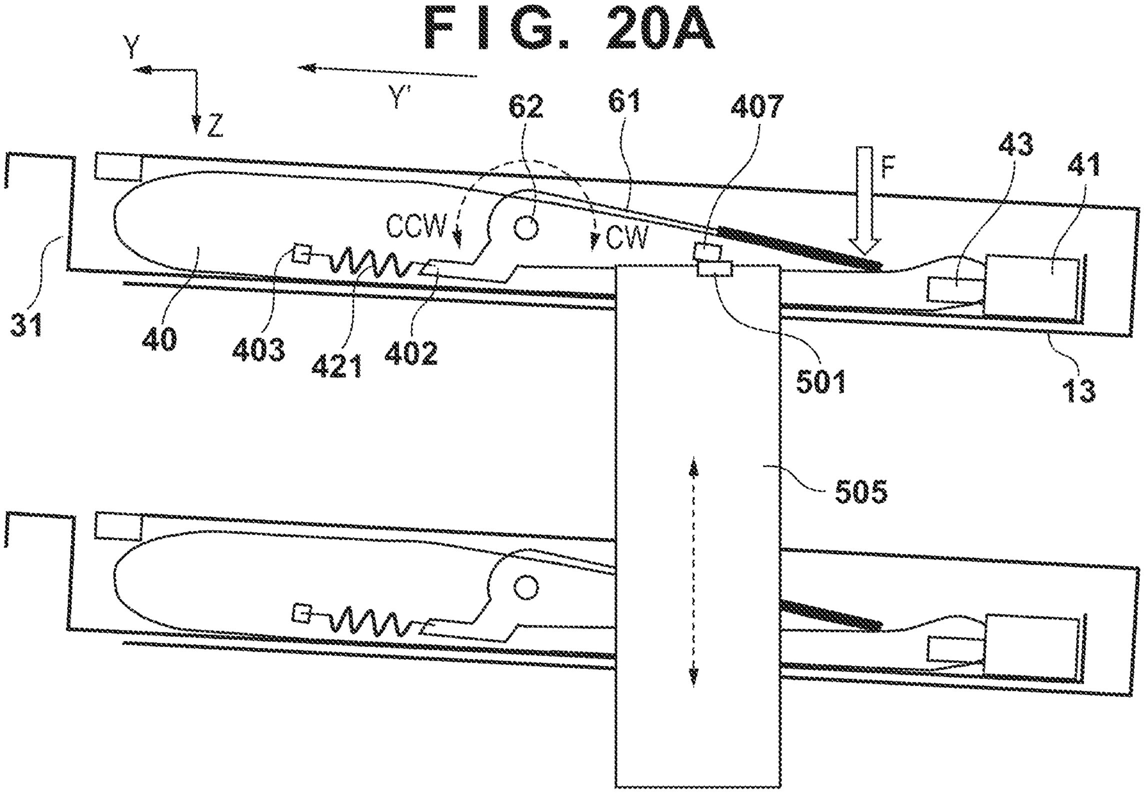
FIGS. 20A and 20B are views showing an elevating mechanism of a press unit.
Figure 20B:
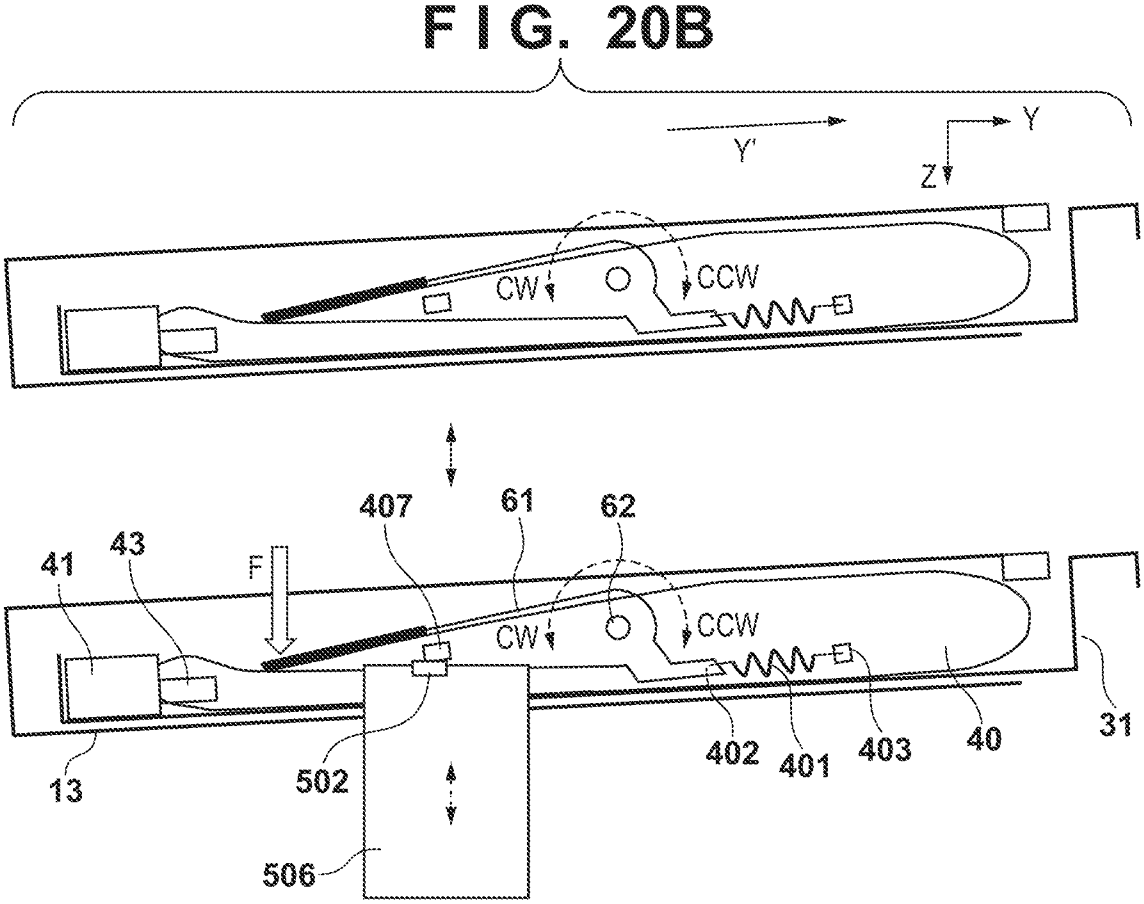
Figure 21A:
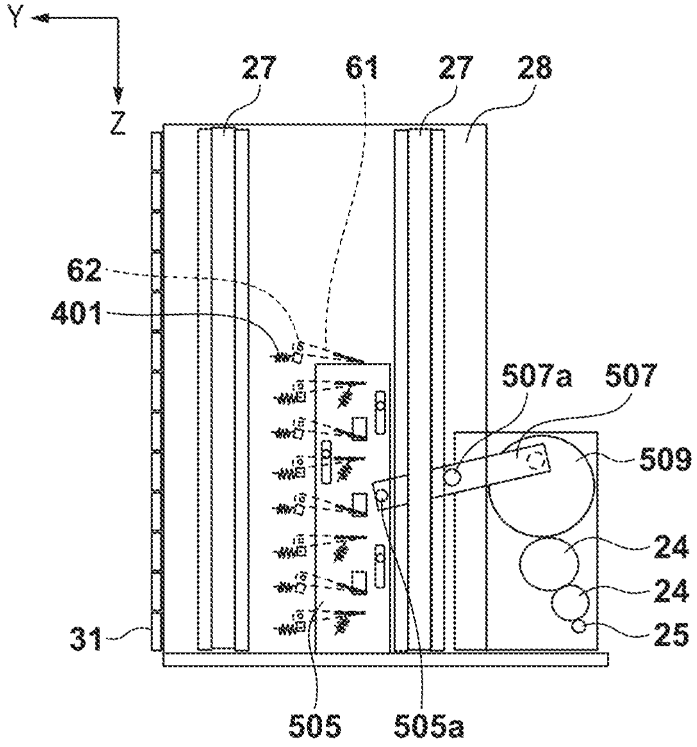
FIGS. 21A and 21B are views showing a stirring drive unit.
Figure 21B:
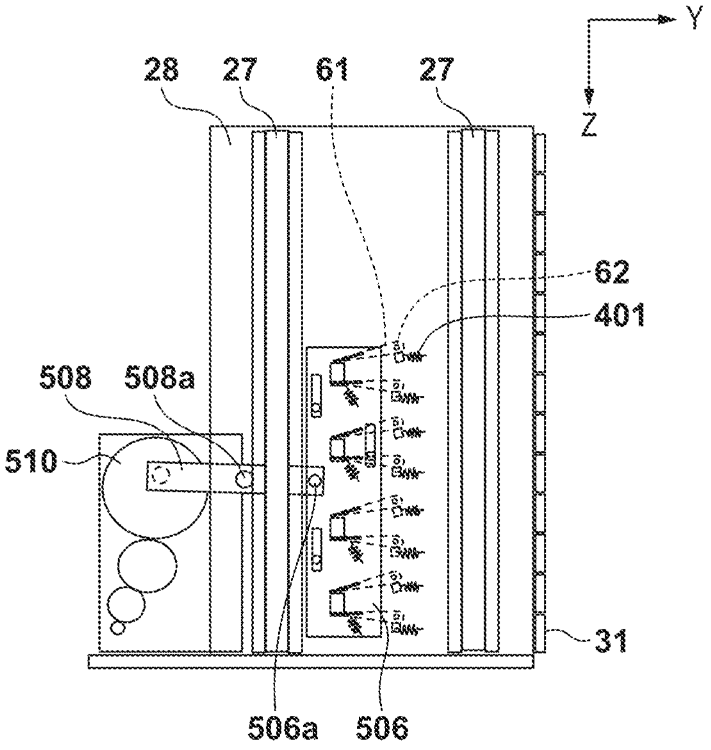

The fourth embodiment will be described next with reference to FIGS. 20A, 20B, 21A, and 21B. FIGS. 20A and 20B are views showing trays and ink tanks of two stages in a liquid supply apparatus according to this embodiment. FIG. 20A is a view of one side surface, and FIG. 20B is a view of the other side surface. FIGS. 21A and 21B are views showing a stirring drive unit 20 in the liquid supply apparatus according to this embodiment. FIG. 21A is a view of one side surface, and FIG. 21B is a view of the other side surface.

A press plate 61 according to this embodiment is different from the press plate 61 according to the first embodiment in that a second press spring is not used, and the press plate 61 on the upper stage is set in a press cancel state by a first elevating plate 505, and the press plate 61 on the lower stage is set in a press cancel state by a second elevating plate 506.

More specifically, a press plate abutting portion 407 of the press plate 61 of the upper stage and a first elevating plate abutting portion 501 of the first elevating plate 505 abut against each other. Also, the press plate abutting portion 407 of the press plate 61 of the lower stage and a second elevating plate abutting portion 502 of the second elevating plate 506 abut against each other.

In addition, the stirring drive unit 20 according to this embodiment is different from the stirring drive unit 20 according to the first embodiment in that two sets of cams and drive transmission levers are driven by a press unit elevating motor 25. More specifically, the press unit elevating motor 25 drives a first cam 509 and a first drive transmission lever 507, which make the first elevating plate 505 perform one reciprocal elevating operation. Also, the press unit elevating motor 25 drives a second cam 510 and a second drive transmission lever 508, which make the second elevating plate 506 perform one reciprocal elevating operation. Note that the first cam 509 and the second cam 510 are connected by the same shaft. This makes it possible to simultaneously transmit the driving force of the press unit elevating motor 25 to the first cam 509 and the second cam 510.

The operations of the first elevating plate 505 and the second elevating plate 506 will be described next with reference to FIG. 22. A graph shown in FIG. 22 shows the positions of the first elevating plate 505 and the second elevating plate 506 when the first cam 509 and the second cam 510 each makes one rotation. Also, a table shown in FIG. 22 shows the operations and positions of the first elevating plate 505 and the second elevating plate 506, and the states of the press plate 61 of the upper stage and the press plate 61 of the lower stage in each of the first to fourth sections in the above-described graph.

More specifically, in the first section, the first elevating plate 505 moves downward, and the second elevating plate 506 moves upward. As a result, in the second section, the first elevating plate 505 is located at the lower position, and the second elevating plate 506 is located at the upper position, that is, the press plate 61 of the upper stage is in the press state, and the press plate 61 of the lower stage is in the press cancel state. Next, in the third section, the first elevating plate 505 moves upward, and the second elevating plate 506 moves downward. As a result, in the fourth section, the first elevating plate 505 is located at the upper position, and the second elevating plate 506 is located at the lower position. That is, the press plate 61 of the upper stage is in the press cancel state, and the press plate 61 of the lower stage is in the press state.

Focusing on the load of a motor concerning this operation, in the second section, the press plate 61 of the upper stage is in the press state, and the press plate 61 of the lower stage is in the cancel state, and, therefore, only a motor load T1 of the lower stage is applied to the motor.

On the other hand, in the fourth section, the press plate 61 of the upper stage is in the press cancel state, and the press plate 61 of the lower stage is in the press state, and therefore, only a motor load T2 of the upper stage is applied to the motor. That is, the load of the motor can be dispersed as compared to a case when the first elevating plate 505 and the second elevating plate 506 are raised simultaneously to generate a motor load (T1+T2) corresponding to two stages.

Note that, in this embodiment, the configuration of two stages has been described. If the number of stages increases, the same effect as described above can be obtained by dividing the stages to be driven simultaneously for, for example, an elevating plate configured to operate odd-numbered stages and an elevating plate configured to operate even-numbered stages. Also, stages to be driven simultaneously may be divided into a plurality of groups by adding a plurality of elevating plates.

Figure 23:
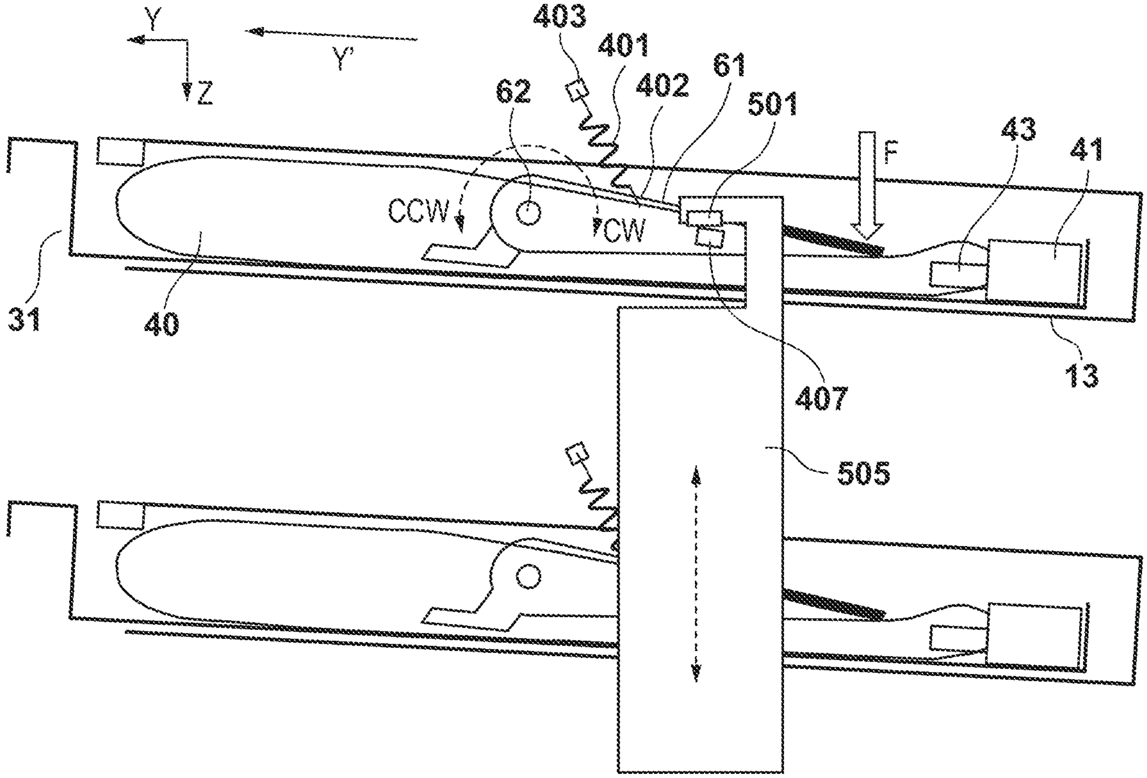
FIG. 23 is a view showing another configuration of a mechanism of a press unit.

Furthermore, if a first press spring 401 is suspended as shown in FIG. 23, the press plate 61 pivots counterclockwise by the tensile force of the first press spring 401 and is set in the press cancel state. If the first elevating plate 505 moves downward, the press plate 61 pivots clockwise and is set in the press state. Note that, even for the second elevating plate 506, the press plate 61 operates similarly. Even in this case, the same effect as described above can be obtained if the first elevating plate 505 and the second elevating plate 506 operate as in this embodiment. The mechanism of the press unit described in the first embodiment and the mechanism of the press unit shown in FIG. 23 may be mixed in the stages, as a matter of course.

Fifth Embodiment

Figure 24:
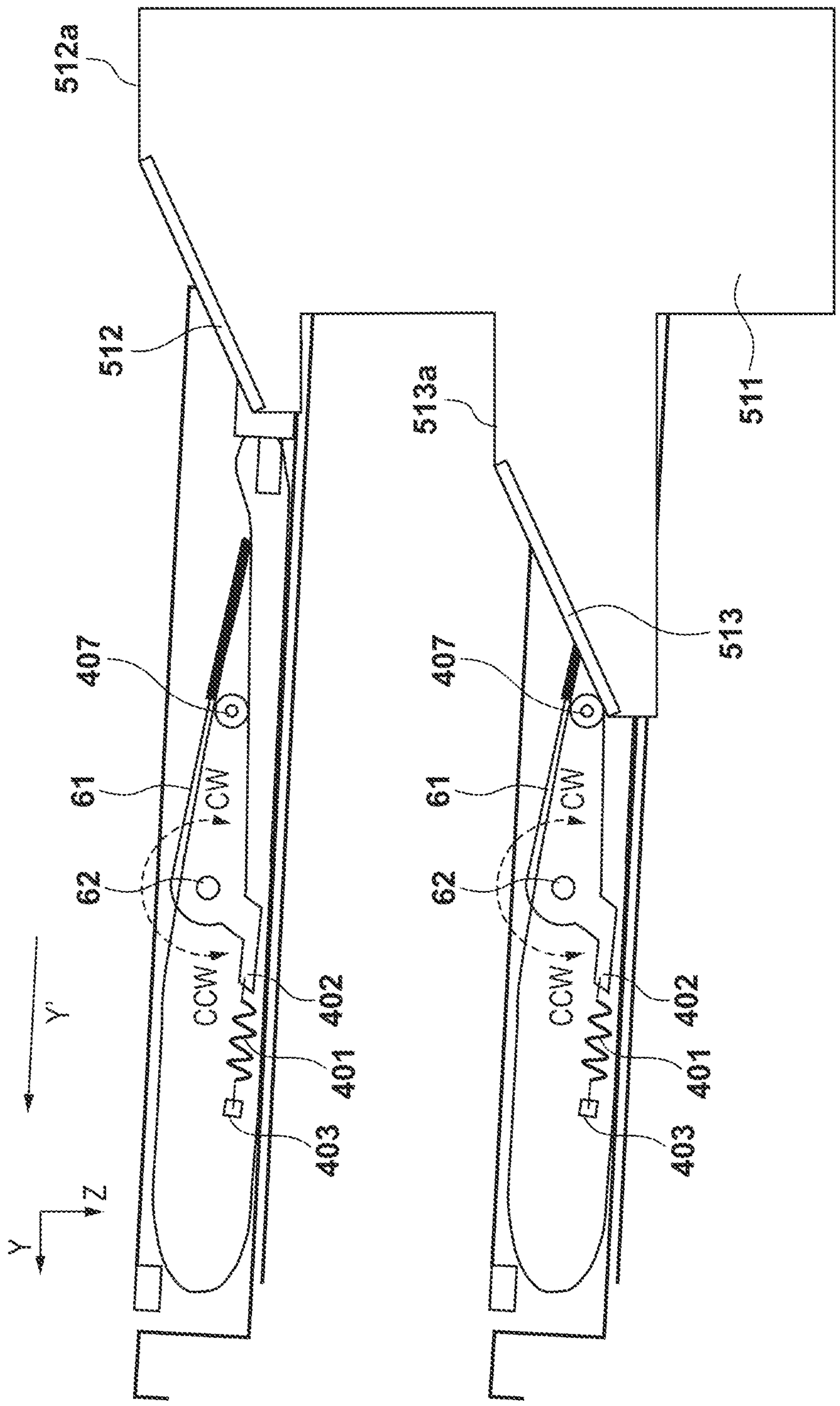
FIG. 24 is a view showing an elevating mechanism of a press unit.

The fifth embodiment will be described next with reference to FIG. 24.

A press plate 61 in a liquid supply apparatus according to this embodiment is different from the press plate 61 according to the first embodiment in that a second press spring 404 is not used. Also, an elevating plate 511 according to this embodiment is different from the elevating plate 21 according to the first embodiment in that the press plate 61 is set in a press cancel state by moving in the horizontal direction.

More specifically, the elevating plate 511 includes an elevating plate first abutting portion 512 and an elevating plate second abutting portion 513. The elevating plate second abutting portion 513 is longer in the +Y direction than the elevating plate first abutting portion 512, and each abutting portion includes a tilting surface. A horizontal operation of the elevating plate 511 is performed using a rack gear and a pinion gear which convert the rotation of a press unit elevating motor 25 into a linear operation. A mechanism other than the rack gear and the pinion gear may be used if it convert rotation into a linear operation.

The operations of the elevating plate 511 and the press plate 61 will be described next with reference to FIG. 24. If the elevating plate 511 moves in the +Y direction, first, the elevating plate second abutting portion 513 and a press plate abutting portion 407 of the lower stage abut against each other. After that, if the elevating plate 511 continuously moves in the +Y direction, the press plate abutting portion 407 is pushed up along the tilting surface of the elevating plate second abutting portion 513. As a result, the press plate 61 pivots counterclockwise about a pivot shaft 62 and is set in the press cancel state. If the elevating plate 511 further moves in the +Y direction, the elevating plate first abutting portion 512 and the press plate abutting portion 407 of the upper stage abut against each other. After that, if the elevating plate 511 continuously moves in the +Y direction, the press plate 61 of the upper stage is set in the press cancel state, like the press plate 61 of the lower stage. Note that at this time, the press plate abutting portion 407 of the lower stage moves horizontally along a horizontal portion 513*a* of the elevating plate second abutting portion 513. Also, if the elevating plate 511 moves in the −Y direction, each press plate returns to the press state by an operation reverse to the above-described operation.

Focusing on a motor load concerning this operation, when the press plate 61 pivots counterclockwise, the tilting surfaces of the elevating plate first abutting portion 512 and the elevating plate second abutting portion 513 receive the reaction force of the first press spring 401. Here, let f be a pressing force by the first press spring 401, and t be a motor load corresponding to the reaction force. Also, if the press plate 61 is in the cancel state, and the press plate abutting portion 407 moves horizontally along a horizontal portion 512*a* of the elevating plate first abutting portion 512 and the horizontal portion 513*a* of the elevating plate second abutting portion 513, the horizontal portions 512*a* and 513*a* receive a frictional force. Let f2 be the frictional force, and t2 be a motor load corresponding to the reaction force.

Here, a frictional force f2 is made small, and the motor load t2 is set to satisfy $t2<t$. As a method of making the frictional force f2 small, in this embodiment, the press plate abutting portion 407 is formed by a rotation member. However, not the rotation member but a member having a small friction coefficient may be used.

As described above, to set the press plate 61 of the lower stage in the press cancel state, the motor load is t. To set the press plate 61 of the upper stage in the press cancel state, the motor load is (t+t2). Since the load t2 includes only the frictional force, the load t2 can be a value much less than the load t. For this reason, as compared to the motor load t2, in a case when the press plates 61 of the upper and lower stages are simultaneously set in the press cancel state, the load of the motor can be dispersed and reduced.

Note, that although the elevating plate second abutting portion 513 is longer than the elevating plate first abutting portion 512 in this embodiment, the elevating plate first abutting portion 512 may be longer than the elevating plate second abutting portion 513. In this embodiment, the configuration of two stages has been described. If the number of stages increases, for example, the elevating plate abutting portion is made longer in a lower stage, thereby obtaining the same effect. The elevating plate may be divided into a plurality of plates.

As described above, in the above-described embodiments, the load of the press unit elevating motor 25 when driving the press plate can be dispersed and reduced. This can suppress an increase of the size of the press unit elevating motor 25 and improve the space efficiency of the entire liquid supply apparatus in turn.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid supply apparatus comprising:

a holding member configured to detachably hold, with respect to the liquid supply apparatus, a tray on which a flexible container provided with a supply port for supplying a liquid to a printhead, is placed;

a press member configured to press the container attached to the liquid supply apparatus;

a movable member configured to move the press member to a first position where the press member presses the container and a second position where a press amount of the press member for the container is smaller than at the first position;

a first spring having one end locked on the press member and the other end locked on the holding member; and a second spring having one end locked on the press member and the other end locked on the movable member.

2. The apparatus according to claim 1, wherein the first spring and the second spring bias the press member such that the press member moves to the first position where the press member presses the container.

3. The apparatus according to claim 2, wherein the movable member includes an abutting portion configured to abut against the press member, the movable member moves in a first direction to separate the abutting portion from the press member, thereby moving the press member to the first position, and the movable member moves in a second direction reverse to the first direction to cause the abutting portion to abut against the press member, thereby moving the press member to the second position.

4. The apparatus according to claim 3, wherein, when the movable member moves in the first direction, a biasing force of the second spring is a load of movement of the movable member, and when, the movable member moves in the second direction, a biasing force of the first spring is a load of movement of the movable member.

5. The apparatus according to claim 1, wherein the movable member repeats a reciprocal operation of making the press member reciprocate between the first position and the second position.

6. The apparatus according to claim 5, wherein the movable member repeats the reciprocal operation only for a first predetermined time and then stops the reciprocal operation only for a second predetermined time.

7. The apparatus according to claim 6, wherein the second predetermined time is longer than the first predetermined time.

8. The apparatus according to claim 1, wherein a plurality of stages of sets of holding members and press members are provided.

9. The apparatus according to claim 8, wherein the movable member moves the plurality of stages of press members at once.

10. The apparatus according to claim 9, further comprising a driver for driving the movable member.

11. The apparatus according to claim 10, wherein the driver includes a motor and a cam to be driven by the motor.

12. The apparatus according to claim 11, wherein the cam makes one rotation to cause the movable member to reciprocate once and stops the movable member for a third predetermined time during one rotation.

13. The apparatus according to claim 12, wherein the cam includes, in a shape of the cam, a portion configured to stop the movable member for the third predetermined time.

14. The apparatus according to claim 12, wherein, if the motor stops, the movable member is stopped for the third predetermined time.

15. The apparatus according to claim 1, wherein an ink that is the liquid is supplied to a printing apparatus that performs printing using the printhead.

16. The apparatus according to claim 15, wherein a color material is blended in the ink.

* * * * *